United States Patent
Yaskin et al.

(10) Patent No.: US 8,472,862 B2
(45) Date of Patent: Jun. 25, 2013

(54) METHOD FOR IMPROVING STUDENT RETENTION RATES

(75) Inventors: David A. Yaskin, Arlington, VA (US); Naomi Horak, Washington, DC (US); Zahra Z. Safavian, Arlington, VA (US)

(73) Assignee: Starfish Retention Solutions, Inc., Arlington, VA (US)

( * ) Notice: Subject to any disclaimer, the term of this patent is extended or adjusted under 35 U.S.C. 154(b) by 1004 days.

(21) Appl. No.: 12/499,298

(22) Filed: Jul. 8, 2009

(65) Prior Publication Data
US 2010/0009331 A1    Jan. 14, 2010

Related U.S. Application Data

(60) Provisional application No. 61/134,296, filed on Jul. 8, 2008.

(51) Int. Cl.
*G09B 3/00*    (2006.01)

(52) U.S. Cl.
USPC .......................................................... 434/362

(58) Field of Classification Search
USPC ................................ 434/219, 362; 705/14.38
See application file for complete search history.

(56) References Cited

U.S. PATENT DOCUMENTS

| | | | |
|---|---|---|---|
| 5,820,386 A * | 10/1998 | Sheppard, II | 434/322 |
| 6,270,351 B1 * | 8/2001 | Roper | 434/118 |
| 6,325,632 B1 * | 12/2001 | Chao et al. | 434/322 |
| 6,688,891 B1 * | 2/2004 | Sanford | 434/365 |
| 6,865,540 B1 * | 3/2005 | Faber et al. | 705/7.25 |
| 6,916,180 B1 | 7/2005 | Price et al. | |
| 7,311,524 B2 * | 12/2007 | Jennen et al. | 434/323 |
| 7,512,627 B2 | 3/2009 | Hossfeld et al. | |
| 8,014,716 B2 | 9/2011 | Ando et al. | |
| 2002/0013836 A1 * | 1/2002 | Friedman et al. | 709/223 |
| 2002/0055089 A1 * | 5/2002 | Scheirer | 434/350 |
| 2002/0064767 A1 * | 5/2002 | McCormick et al. | 434/396 |
| 2002/0178038 A1 * | 11/2002 | Grybas | 705/7 |
| 2003/0036046 A1 | 2/2003 | Smolover | |
| 2003/0088434 A1 * | 5/2003 | Blechman | 705/1 |
| 2003/0134261 A1 * | 7/2003 | Jennen et al. | 434/354 |
| 2003/0165802 A1 * | 9/2003 | Murphy | 434/350 |
| 2003/0236796 A1 | 12/2003 | Easter et al. | |
| 2004/0009461 A1 | 1/2004 | Snyder et al. | |
| 2004/0044684 A1 * | 3/2004 | Easter et al. | 707/103 R |
| 2004/0110119 A1 * | 6/2004 | Riconda et al. | 434/350 |
| 2004/0153509 A1 * | 8/2004 | Alcorn et al. | 709/205 |
| 2004/0191744 A1 * | 9/2004 | Guirguis | 434/322 |
| 2005/0048458 A1 * | 3/2005 | Collins et al. | 434/323 |
| 2005/0100875 A1 * | 5/2005 | Best et al. | 434/362 |
| 2005/0282125 A1 | 12/2005 | Christensen et al. | |

(Continued)

OTHER PUBLICATIONS

Starfish Solutions <retreieved from: http://web.archive.org/web/20080418144714/http://www.starfishsolutions.com/ > < retreived on Apr. 18, 2008>.*

(Continued)

*Primary Examiner* — Robert J Utama
(74) *Attorney, Agent, or Firm* — Woodcock Washburn LLP

(57) ABSTRACT

An integrated student retention system that automatically raises flags identifying at-risk students; permits students to raise flags identifying themselves as at-risk; permits providers to raise flags identifying students as at-risk; provides systems facilitating the process of enabling students to obtain assistance; provides systems for tracking students and providers; and provides systems for measuring effectiveness.

50 Claims, 8 Drawing Sheets

U.S. PATENT DOCUMENTS

| | | | |
|---|---|---|---|
| 2006/0127870 A1* | 6/2006 | Fields et al. | 434/350 |
| 2006/0286521 A1* | 12/2006 | Clark | 434/238 |
| 2007/0020604 A1 | 1/2007 | Chulet | |
| 2007/0099167 A1* | 5/2007 | Eason | 434/350 |
| 2007/0165649 A1* | 7/2007 | Moritz | 370/395.64 |
| 2007/0218446 A1* | 9/2007 | Smith et al. | 434/350 |
| 2007/0298400 A1* | 12/2007 | Alabi | 434/350 |
| 2008/0057480 A1* | 3/2008 | Packard et al. | 434/188 |
| 2008/0154960 A1* | 6/2008 | Francisco | 707/104.1 |
| 2009/0017433 A1* | 1/2009 | Belsky et al. | 434/362 |
| 2009/0023124 A1* | 1/2009 | Towell et al. | 434/322 |
| 2009/0029339 A1* | 1/2009 | Botha et al. | 434/433 |
| 2010/0009332 A1* | 1/2010 | Yaskin et al. | 434/362 |

OTHER PUBLICATIONS

Thoughtwright LLC, "ThoughtWright, LLC: GradesFirst—Student Services" http://www.gradesfirst.info/Advisors.aspx Website, available as of at least Jul. 15, 2009.

Datatel, "Datatel Colleague Student Retention Alert" http://www.datatel.com/products/products_a-z/retention_alert.cfm Website, available as of at least Jul. 15, 2009.

Noel-Levitz, "Retention Management System Overview" https://www.noellevitz.com/Our+Services/Retention/Tools/Retention+Mgmt+System/ Website, available as of at least Jul. 15, 2009.

Hobsons, "EMT Retain" http://www.hobsons.com/products/emtRetain.php Website, available as of at least Jul. 15, 2009.

Educational Benchmarking, "MAP-Works—Making Achievement Possible (Map)" http://www.map-works.com/Overview.aspx Website, available as of at least Jul. 15, 2009.

Advisortrac, "Advisor and Advisement Center Management Tracking Software" http://www.advisortrac.net/ Website, available as of at least Jul. 15, 2009.

SARS Software Products Inc, "Welcome to SARS Software Products, Inc." http://www.sarsgrid.com/prod_sarsgrid.html Website, available as of at least Jul. 15, 2009.

Stanford, "CourseRank—FAQ" https://courserank.stanford.edu/CourseRank/faq Website, available as of at least Jul. 15, 2009.

Starfish Retention Solutions, "Starfish Retention Solutions" http://www.starfishsolutions.com/solutions.html Website, available as of at least Jul. 15, 2009.

Exhibit A: Starfish Retention Solutions, Inc., "Retention Delivered: One Student at a Time," Accessed from Internet Archive: http://wayback.archive.org/web/20080615000000*/http://www.starfishsolutions.com/, Jun. 15, 2008, 10 pages.

* cited by examiner

METHOD FOR IMPROVING STUDENT RETENTION RATES

CROSS-REFERENCES TO RELATED APPLICATIONS

This is a utility patent application, taking priority from provisional patent application Ser. No. 61/134,296, filed Jul. 8, 2008, which is incorporated herein in its entirety.

BRIEF DESCRIPTION OF THE INVENTION

The present invention is directed to an integrated student retention system that automatically raises flags identifying at-risk students; permits students to raise flags identifying themselves as at-risk; permits providers to raise flags identifying students as at-risk; provides systems facilitating the process of enabling students to obtain assistance; provides systems for tracking students and providers; and provides systems for measuring effectiveness.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK.

Not applicable.

BACKGROUND OF THE INVENTION

Social, cultural, financial, and academic challenges interplay and any one challenge can have a key impact on the academic success of a student. Identifying students with such challenges, also called "at-risk students", is an important issue faced by academic institutions, especially since increased student retention helps more students graduate and generates more revenue for the academic institutions. However, many students are not aware of student retention or success programs, or might be hesitant to use such programs for a number of reasons, including inconvenience, intimidation and peer stigma. Leaving such programs solely to the discretion of students can be problematic. Likewise, assuming such programs are effective just because they exist is nonsensical.

Student success programs need to be effective at identifying at-risk students as early as possible, need to use multiple identification sources, need to make it easy for students to get help, need to make it easy for other people within the academic institution to help the students, and need to make it possible for administrators to track the students and the effectiveness of the program.

One possible solution for identifying at-risk students is to use a course management system. Course management systems, sometimes also referred to as Learning Management Systems, provide web-based access to teaching-and-learning content and services. Course management systems are used by most higher education institutions; however, not all of these institutions make use of the vast amounts of data collected by the course management systems. Course management systems typically keep records of course grades, assignment grades, exam grades, and other activities which a student might be involved in at the academic institution. Examining the course management data can help academic institutions identify students at-risk. For example, Purdue University pulls student data from its course management system, including student activities, student assignment grades for each course, exam and quiz scores, class absences, and missed assignments and inputs the gathered student data into a predictive system in an attempt to identify at-risk students.

Other possible solutions include GRADESFIRST and RETENTION ALERT. GRADESFIRST is a tool targeting the improvement of student retention rates and monitoring various student activities at an academic institution. Features of GRADESFIRST include early alert of at-risk students, appointment scheduling with reminders, attendance tracking, assignment tracking, tutor management, and various summary reports. RETENTION ALERT is a retention management system that allows for the tracking and monitoring of aspects of a student's education. A set of rules can be set based on the institution's preferences, such as a GPA range, or failing grades in a course or program of study, or the rules can be manually set by an institution administrator, an instructor, or an advisor. Student progress and trends can be analyzed with the system.

GRADESFIRST and RETENTION ALERT focus on providing tools for the academic institution's providers to help students succeed by identifying those students who might be at-risk. Neither system supports providing students with self-help services, which would allow students to take a proactive approach if a student felt the need for help or if the student wanted to take advantage of a service that might help the student get ahead.

Noel Levitz's RETENTION MANAGEMENT SYSTEM/COLLEGE STUDENT INVENTORY takes a more reactive approach to student retention since it waits for students to self-identify their needs and their keys to success. It consists of a survey administered to students, preferably incoming students or administered to students early in their college career, which asks each student about their academic motivation and receptivity to assistance. The results compiled from all data can be used by the student service providers, such as administrators, instructors, advisors, or student associations, to determine the best strategies to use in order to retain the students and ensure the success of the students throughout their academic studies.

Another example of a student retention system is EMT RETAIN, by HOBSONS. EMT RETAIN is a web-based, automated alert system, that also allows for communication between the administrators and the students most at-risk. Another service provided by HOBSONS is EARLY ALERT, which includes a survey to assess and address student challenges. This allows institutions to find areas to improve and to develop strategies and programs to help at-risk students. HOBSONS also provides a predictive modeling service that analyses the institution's historical data and builds statistical models in order to forecast student success and retention rates. The resulting data can also be used to compare year-on-year data that can be used to assess the effectiveness of additional programs and retention strategies and techniques. One of the deficiencies of this retention system is that the collected information or specific individual cases are not routed to a specific organization based on the problem identified by the collective data or a problem identified with an individual student.

MAP-WORKS is a student retention system by EDUCATIONAL BENCHMARKING. This system allows an institution to track a student's progress and to find at-risk students. Students fill out a survey, preferably on the third week of the semester. The survey data is compiled and sent to the corresponding staff/faculty at the institution. This allows the corresponding faculty/staff to intervene or contact the student based on the student's report and the student's progress. Students are flagged in the compiled data using three colors: red, yellow, and green. Students flagged as red are students who are at-risk, where there is a major concern and action needs to be taken. Students flagged as yellow are students for whom there is some concern, while a green flag means that there is no concern. The students at-risk can then be contacted and directed to corresponding school resources that can help them.

Examples of systems that help students schedule appointments with providers of the academic institution are ADVISORTRAC and SARS GRID. ADVISORTRAC is an appointment system targeting advisement and counseling centers. It allows students to set up appointments. The advisors/counselors can see the student's records online via a web interface. Similarly, SARS GRID is a scheduling system that can be used by advisors, counselors, and administrators of an academic institution.

CourseRank is an unofficial system used by Stanford which allows students to get information on classes, teachers, and to keep track of their academic requirements to manage graduation requirements. Students can rate courses, rate professors, and provide reviews on classes. This allows students to see the experiences other students have had with certain classes or instructors. The course planner allows students to plan ahead, to make sure they have taken all required courses, and if not, it provides suggestions for courses to the students. While such a system does help students manage their course requirements for graduation, and to assess classes to take and professors who have positive reputations, and consequently avoid those with poor reviews, the system does not target student retention, and it does not allow either the students or the members of the academic institution to identify and address issues which might be negatively affecting a student.

As noted above, several systems that provide partial, possible solutions to the student retention problem have been proposed. Some focus on analyzing usage data of course management systems and other student information systems in order to identify and make informed decisions to improve the performance of the academic institution. Passive monitoring of student scores on standardized or placement tests as well as course grades has also been proposed. Some systems also propose the comparison of aggregate data with other academic institutions. For examples see U.S. Pat. Nos. 7,311,524, 7,512,627, Published U.S. patent application Ser. Nos. 10/106,575, and 10/870,099.

All of these systems provide partial solutions. Even if these systems are combined, they do not provide a comprehensive suite to address the problem of student retention. Rather, the various systems follow one-sided models, where the students either help themselves, such as by filling out a survey, or members of the academic institution take action on behalf of the students, such as the manual flagging of students who might be at-risk, but no system provides a comprehensive solution that is effective at identifying at-risk students as early as possible, uses multiple identification sources, makes it easy for students to get help, makes it easy for other people within the academic institution to help the students, and makes it possible for administrators to track the students and the effectiveness of the program.

DETAILED DESCRIPTION OF THE INVENTION

Figure 1:
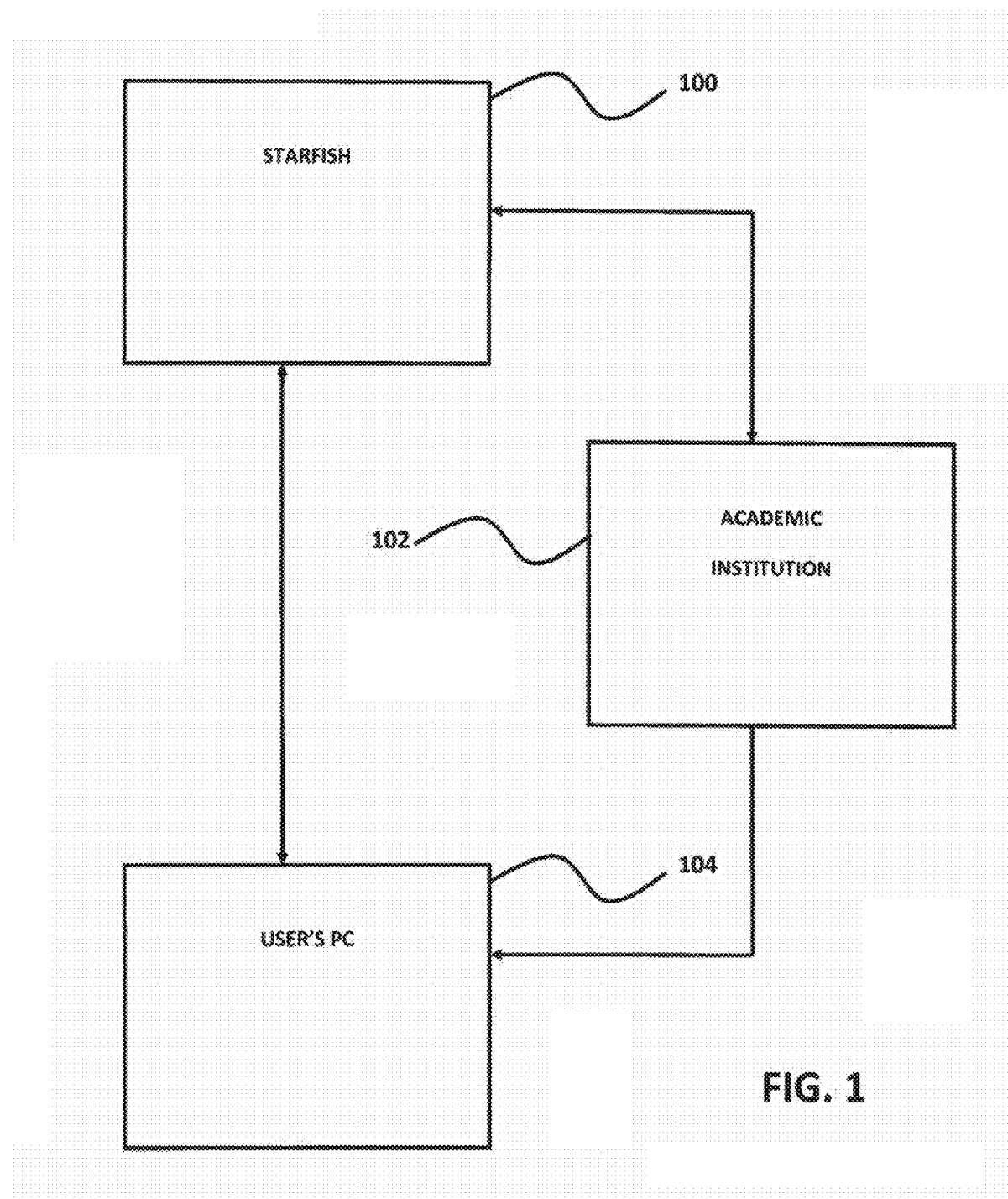
FIG. 1 is a block diagram illustrating the broad interaction between the present invention, an academic institution, and a user's computer.

The present invention is directed to an integrated student retention services suite that utilizes a networked computer system to automatically raises flags identifying at-risk students by mining data available from one or more computerized academic management systems, including an academic institution's course management system and other student management or information systems; permits students to raise flags identifying themselves as having a problem or needing help; permits instructors, counselors, tutors, advisors, or other members of the academic institution to raise flags to identify students who need help; provides a variety of systems that facilitate the process of enabling students to obtain assistance, such as schedule and attend office hours with instructors and other providers of the academic institution; provides the academic institution with systems for tracking students and providers; and provides analytic tools that enables the academic institution to track its own effectiveness and compare itself to other institutions. The preferred embodiment of the invention consists of a set of services that can increase the student retention rates of academic institutions by providing self-help services to students, facilitating communication between students and providers that can intervene, and providing the providers of the academic institution with the tools to help, identify, and direct students to resources that can help them.

Some of the management system services include: faculty office hours management, peer tutoring management, tutor center management, mentor program management, advising management, counseling management, and further retention management services. The preferred embodiment of the management system would run on a client's web browser, including functionality such as dynamic menus, auto-complete features, drag and drop support, navigation via menus, context sensitive menus and information when appropriate, and help wizards. Alternative embodiments of the invention may also run as a desktop application.

Throughout the remainder of this detailed description, the terms "Starfish system" or "system" will be used to refer to the overall system, and/or parts of the overall system, of the present invention. The term "provider" will be used to refer to members of an academic institution, including instructors, advisors, counselors, tutors, mentors, and other academic staff. The term "administrator" will be used to refer to those members of an academic institution in charge of managing the deployment of the Starfish system and its successful integration with the systems of the academic institution, such as the course management system and other student information systems.

The Starfish system uses a combination of data to determine at-risk status, including student information system data, data from course management systems, and data provided by front-line service providers at the institution, such as student success program providers, resident assistants, and instructors, as well as the students themselves. Most importantly, the Starfish system manages information so that it is delivered to relevant parties depending on the context of the problem to which it relates and intervenes as necessary to make sure that students are getting help when needed.

In the preferred embodiment of the present invention, the user interface that enables users to access the set of retention services provides different access levels to the Starfish system. The interface also varies depending on the role and permissions of the user accessing the Starfish system. The present embodiment anticipates three main interfaces which can work together for users with more than one role, or dashboards: a student interface, a provider interface, and an administrator interface.

The student interface will allow students to access personal academic management information and systems that include easy scheduling, appointment tracking, self-assessment, self-help, and provider-action-item tracking. The provider interface will organize, simplify, and efficiently allow providers to direct and suggest to students good policy compliant services. Features accessible through this provider interface will include appointment management, appointment guidance, and a place to record notes and documentation related to students. In another embodiment of the present invention, additional interfaces, either at a higher or lower access level, can be added depending on the policies and needs of the academic institution. Higher level interfaces can include a departmental supervisor interface, allowing for the setting of policies and reporting. An institutional interface, accessed by administrative staff at the academic institution, can be used to determine the effectiveness of certain services or programs by analyzing the results and associated costs of offering each service, with comparisons available across services and benchmarking with other institutions offering similar services.

Authentication of system users can be done in a variety of ways. In an embodiment of the present invention, a user with a credentialed session on a course management system will click a link that passes an authentication token to the Starfish system. From that request, a Starfish system session will be created. Alternatively, a user can login directly to the Starfish system, with the Starfish system subsequently passing those credentials to the course management system associated with the campus/institution for verification of the user. In yet another embodiment of the present invention, a user can login directly to the Starfish system by using Lightweight Directory Access Protocol (LDAP) authentication. In this case, the user's credentials are checked against a LDAP server associated with the campus or institution. In another embodiment of the present invention, a user can login directly to the Starfish system, but where the user credentials are checked against a central database of encrypted credentials. In the preferred embodiment of the present invention, an academic suite implementation offered by BLACKBOARD INC. is used as the course management system, the user interface of the Starfish system is integrated into the user interface of the academic suite, and a link is provided on the academic suite menu that redirects users to the Starfish system interface.

The at-risk indicator data processed by the Starfish system will come from three sources: (1) the course management system, (2) student management or information systems, and (3) manually entered data. In an embodiment of the present invention, data from the course management system is sent to the Starfish system based on a timed background thread, which pushes data on a set schedule. Data will also be collected and sent from the student management or information systems through the use of custom logic that extracts relevant data. The extracted data will then be sent to Starfish system via secure channels. In another embodiment of the present invention, the data extraction may also involve hand-processing. Finally, web forms from the Starfish system will capture a variety of data from students and providers.

The Starfish system causes greater engagement between students and providers by providing the students with efficient systems and tools for contacting and meeting with providers. By allowing a student to schedule an appointment through the Starfish system, the student is guaranteed to have the scheduled time to discuss issues the student might be facing, be it academic or financial issues. Having a set appointment time provides great flexibility to students, who will not have the feeling of being rushed and pressured because of the presence of other students who might have showed up at the same time to meet with the provider. The use of the system allows the student to feel more at ease during the appointment, and also to have the guarantee that the provider will be available during the scheduled time, instead of the hit and miss approach to finding the provider at his/her office and checking for the provider's availability. The flexibility of using the scheduling system also allows the providers to be better prepared to meet the needs of the students who sign up for appointments. The appointment alerts allow providers to understand the visiting student's needs, thus making the appointment a fruitful experience for the student.

Some of the benefits of the Starfish system for the provider are that the system manages and keeps track of student progress and student activities. For example, if a provider meets with a student, and subsequently sees the need to raise a flag and to place a request for a financial advisor to meet with the student, the Starfish system manages all the student history by storing it in a student folder. The provider is not in charge of creating an electronic folder or directory, and saving all associated communication between the provider and the student in the folder, since all of this data management is handled by the Starfish system. The provider, if necessary, can specify some of the data or notes created by the provider as private. The Starfish system allows the provider to become further engaged with students, but without an increased burden by having to manage additional paperwork or correspondence. The success network of the Starfish system also enables different providers to work together toward insuring the success of students.

The Starfish system also automates the process of searching and identifying students who might be at-risk. The system can search all of the student data available, trying to determine whether a student falls within one of many at-risk conditions, specified either by the system or specified by the academic institution. The conditions, or set of rules for identifying at-risk students, can consist of conditional expressions. For example, a student could be identified as at-risk if one of the following conditions matches a record in the student's folder: the student got lower than a 60% on an exam in any of the enrolled courses; the student has missed attendance at least two times for any of the enrolled courses; the student has not scheduled an appointment for the required advisement meetings per semester, etc. Once students have been identified as at-risk, the flagged students (both visually within the system through various user interface displays and electronically within data files stored in the system database) can then be directed to services and providers that can help them.

This can also be automated by the Starfish system by sending alert messages to certain providers based on the type of flag raised for each student, and based on the roles and relations certain providers might have with the student. For example, if a student was flagged for missing attendance on a class, then the flagging notice could be sent to a general counselor, while a student flagged for getting a low exam score on a class could result in the flagging notice sent to the instructor of the class and the departmental head. Such flagging automation allows providers to devote their time and resources to helping the students, instead of concentrating on the managing and analyzing of large amounts of data. The use of roles and relations guarantees that the right information is sent to the right people at the right time to insure that students get help and intervention when needed.

To academic institutions the Starfish system provides an assessment tool. The Starfish system can be used to determine the services that provide the greatest benefit to students, the services used the most and the services used the least, the student performance based on a variety of demographics, and also serving as a benchmarking tool across departments in an academic institution and with other academic institutions.

In the preferred embodiment of the present invention, the Starfish system interface will be linked through the academic institution's course management system and/or other systems. Course management systems typically consist of a set of modules that provide users with listings of enrolled courses, course grades, a calendar, a dictionary, and other utilities that facilitates the aspects involved in teaching a course, such as the distribution of materials, sending of announcements, postings of assignments, assigning grades to students, etc. The various modules included in the course management system depend on the needs or requirements of the academic institution and the students.

Part of the reason for the popularity and power of course management systems lies on its flexibility to accommodate the diverse needs of providers at the academic institution. For example, modules can be edited by the user, depending on the functionality provided by the module. For example, settings for a calendar module that can be modified include the number of days to show the user, such as the next seven days from the current date, all the days in the current month, a monthly view of the year, etc. Another example of editing settings associated with a module includes editing the type and amount of information to display for each course on the course listing for the student.

A key distinguishing feature of the system is that the automatic flagging, the manual flagging, and the tracking and analytics can all be done within the user interface of the course management system used by the academic institution. Course management systems have become integral and convenient tools used by providers. The system integrates into this same user interface, not only providing a consistent look and feel to the features provided by the system, but it also allows providers to stay within the course management system. Other systems which provide partial solutions to the student retention problem force users to use and get accustomed to a new system, and the lack of integration with the course management system discourages users from embracing such systems. The integration of the Starfish system with the course management system used by academic institutions encourages providers to use it, which is a key to student success. The same applies to students, who are required to use the course management system if their instructors post course materials, grades, and announcements through the course management system. This has the further benefit of lessening the learning curve for both students and providers, since the integration of the Starfish system with the course management system will allow all users to feel less intimidated about using the Starfish system features.

The Starfish system home page for the student interface, or dashboard, will display a set of appointments, the courses currently being taken by the student, and a list of the student's success network. The student's success network refers to members of the academic institution, the providers, who have been or are currently academically involved with a student. For example, instructors for the courses that the student is currently enrolled in can be part of that student's success network. Examples of other providers which can be part of the success network list are present and past academic advisors, current and past teaching assistants for courses, counselors, etc. A list of a student's success network will be listed on the student's dashboard, and the list will also provide links that enable the student to see available appointment times for each network member, allowing the student to easily contact past and present providers.

The success network is a two level system. The first level is a set of favorites for the student, consisting of personal relationships that will be heavily used, such as instructors or an advisor. The second level is the available people and services, such as skills testing, career counseling, mental health services, among others. An entry on the student's success network is moved automatically from the available set to the set of favorites by making an appointment with a provider listed under the available set. Alternatively, the student can manually add a member to the favorites or to the available people and services in the success network. In one embodiment, the student is responsible for manually adding entries to the favorite set and the set of available people and services. In another embodiment, the academic institution could prepopulate both levels, favorites and available, through various data upload formats and manual web pages. Alternatively, the system could allow for a list of advisor-student pairs to be uploaded in order to build or initialize a student's success network. Providers may also be allowed to add themselves to a student's success network. For example, athletic advisors could be allowed to add themselves to one or more athletes who have been identified as having problems.

In the preferred embodiment, the entries in the success network will primarily consist of providers. However, in the case that a dedicated advisor is not available, a corresponding service could be listed in place in the success network. The student could then learn of various providers who can provide the student. Alternatively, the system could automatically assign a provider for each request/appointment submitted by a student. Such an approach to implementing the success network is more useful to a student than a typical services web site, because it is organized around the problem instead of simply providing a listing. For example, if a student needs help in a math course, the student can find help by looking under the tutoring entry in the success network, instead of having to search through entries of who offers the services, such as department tutoring, residence hall tutors, Asian American Association tutoring, etc.

The user will have the option to either add a new appointment or edit an existing appointment. The calendar will have several views, such as a day view and a week view. The day view lists office hours, if available, for instructors. Office hours will be denoted as blocks, with open slots shown with a plus sign and a "Sign Up" caption, however, the choice of icon or user interface element uses is not as important as the functionality. Once the user selects an open slot, a dialog box or window will open, where the user will be able to enter information relevant to the appointment. For example, the dialog window can show the name of the professor or staff member with whom the appointment is being scheduled. Other information that can be part of this dialog window includes the date and time of the appointment, the duration time, the location of the appointment, and one of a number of pre-selected reasons as to why the student is making the appointment. Students can also provide a detailed description of the appointment, where the student can specify what he/she hopes to accomplish or concerns the student wishes to have addressed during the scheduled appointment. Once the user saves the appointment information, the dialog window will close and the slot selected by the student will be shown as busy to reflect the newly scheduled appointment. The user will also have the option to either cancel or edit the previously scheduled appointment.

In another embodiment of the present invention, in addition to specifying why the appointment was made, during appointment scheduling, the student may also specify personal and academic goals and attach drafts for review by the provider, if applicable. If the student did not provide details such as goals and the reason for the appointment, then the scheduling system could automatically provide the instructor with a hyperlink to the student's profile, or a summary of information from the student's profile could be sent to the provider when the corresponding appointment alert is sent. In addition, the scheduling system could provide a snapshot of the student performance by providing data gathered from the course management system, such as the latest student grades, class rank, and attendance data.

Group appointments may also be supported. For example, if a group of students is working on a student project for a course, then one of the students in the group can create an appointment for the group with the provider. In this case, the names of the appointment participants can also be included in the appointment details. If members of the group are working on different portions of a project, each can then include an attachment or note to the appointment details, thus allowing the instructor to view the progress made by each member of the team, and to also be able to address the needs of all team members. Alternatively, a student can submit a proposed appointment time. The other team members would then be allowed to vote on the appointment time based on their availability.

The group appointments are also a useful tool for arranging a meeting for a large group of students, such as for a student club, a study session for a course, or to specify group sessions for user studies. For example, a club president can specify the next club meeting, allowing the individual club members to then specify whether they will be attending. Alternatively, if a provider is the advisor for a club, the advisor can schedule a time for the next club meeting, allowing the club members to sign up for the club meeting.

A listing of all upcoming appointments for the student will be displayed as part of the student interface or dashboard. The listing provides the student with brief information about each of the appointments, such as the name of the provider with whom the appointment was made, the date and time of the appointment, the reason the student made the appointment, the location of the appointment, including online and phone locations for remote meetings, and the contact information for the provider. If a student wishes to change a scheduled appointment, the user can use the edit option to change the appointment settings, in which case the student will be redirected to the appointment editing dialog.

If the student is viewing the available appointment times for a given instructor, then the instructor information will be displayed beneath the calendar. The instructor information may include excerpts taken from the instructor's profile: the instructor's contact information, a small biographical excerpt, and an excerpt of what the instructor typically addresses during office hours with students. In an embodiment of the present invention, a selection of endorsements made by other students will be displayed on the instructor information panel.

In another embodiment, when viewing appointment options for a course instructor, additional providers can also be listed as available to meet with students, allowing students greater flexibility in case a student cannot attend the meeting times posted by the instructor but is able to attend the meeting time posted by the teaching assistant. Other providers which might also be listed along with a course instructor would include supplemental instruction staff and tutors. In the case where a student is viewing appointment options for a primary advisor, other advisors in the same department can also be listed as secondary options in case the dedicated advisor is not available, such as being on sabbatical leave or attending a conference, or the student might find the meeting times with the other advisors to be at more convenient times.

The student will also be given the option to view all endorsements made by other students or to add an endorsement about the student's experience with the provider. The endorsement allows students who have visited the provider, and were pleased with the experience and the end-results, to provide positive feedback about their experience with the provider that can be viewed by other students. As this feature is meant to encourage further use of the institutional services, only positive feedback is utilized and a filtering or editing process is required by the provider to filter out negative feedback that might dissuade other students from visiting.

Students will be able to specify settings related to appointment reminders or alerts. These settings might be set as the default at the administrator level, but each student may further customize these settings. For example, options for when to be reminded of the appointment can include the day before the appointment, the day of the appointment, 15 minutes before, etc. The system also gives students the flexibility of specifying how to receive the message, such as an email, text message, or a FACEBOOK message.

The student interface in the preferred embodiment of the present invention also includes a course listing. In contrast to the course listing for typical course management systems, the present course listing also emphasizes the office hour scheduling functionality, so course listings and provider assistance can be tightly integrated, which makes it more likely that the student will seek help. The listing of each course will include the name of the instructor, a listing of all office hours held by the instructor, and a link to the calendar page which will display the available office hour slots for the selected provider. The student user will be given the option to view the courses currently being taken, courses from previous semesters, all courses ever taken by the student, as well as upcoming courses the student may be required to take to complete a degree. In an embodiment of the present invention, the instructor names will be listed under the corresponding course on the course listing. If a listed provider has not set up office hours to be scheduled online, a student can fill out an anonymous petition for the provider to use the system. These petitions can then be used by the administrator to encourage providers to use the system. In yet another embodiment of the present invention, the Starfish system will provide submitted petitions to departmental heads, received on a per case basis or a summary of petitions associated with the given department, who can then address the need to use the online scheduling system for the students' benefit.

The student interface will also include a list of announcements and invitations. Some of these announcements can be system related, such as informing the students that the last day of class is approaching, or the last day to pay semester tuition without any late fees, etc. The invitations can be sent to all students for a provider, or they can be sent to specific student groups, such as an incoming freshman class. In an embodiment of the present invention, instructors can send invitations specific to students enrolled in a course being taught by the instructor. In yet another embodiment of the present invention, the invitations can be sent by departmental heads, to all undergraduates, or to all undergraduates belonging to the corresponding academic department, or a club president can use it to send invitations to the club members. The invitations list will also display to the student appointment requests made by a provider. For example, the provider for a course can request an appointment with a student who is identified as at-risk because of poor grades in several assignments or a test, or any of numerous other tracked attributes.

The student interface will allow each student to upload their picture and to enter contact information, such as phone numbers, email addresses, and a preferred correspondence method. To prevent students from uploading inappropriate pictures, the system could be linked to a student directory system or security system that includes official photos of each student, which could then be used in place of student provided photos. All of the student data will be protected according to the Family Educational Rights and Privacy Act (FERPA) regulations. The student profile completed by the students in the student dashboard, can then be viewed by providers, allowing providers to easily identify who is making an appointment, and it also enables providers to more readily and accurately contact a given student by using the student provided information from the student profile. Alternatively, profile data about the student stored in the course management system or student information system could be automatically uploaded to the student profile, allowing the student to further edit the automatically uploaded data. The provider interface, or dashboard, provides more controls than the student interface. In the preferred embodiment of the present invention, the modules available to the instructor, each encompassing a page in the user interface, will be a home page, an appointments module, a student module, an engagement module, and a profile.

The home page will provide the instructor with access to a variety of options: inviting students to make appointments, adding office hour blocks, adding a group session, making a referral, a panel listing upcoming appointments, a panel listing recent appointments and student status changes, and a panel listing flagged students. The manner in which these options are presented will depend on the needs of the academic institution, and will be fully customizable by the administrators of the academic institution.

A status change, or student activity data, consists of any changes made to the student folder, where all data associated to the student and data tracked by the Starfish system are stored. Such changes related to a student would include adding a new flag related to the student, removing a flag, adding a note related to the student or to a flag raised about the student, and student activity such as scheduling a new appointment, attending an appointment, failing to attend an appointment, receiving a request from a provider to attend an appointment or to use a service, etc.

Inviting a student for an appointment can be done by either pressing an invite button or selecting a hyperlink. The invitation sends a message to the student, requesting the student to make an appointment with the provider during one of the available office hour blocks.

The office hour blocks are specified by selecting a menu, hyperlink, or button option. Selecting this option will open a new dialog window. The provider can then enter a title for the office hour block, which is viewable on the calendar over the corresponding office hour blocks; the frequency of the office hours, such as daily, weekly, monthly; repeat patterns; the start and end times of the office hours; the location of the meeting; and the amount of time to allocate to each appointment. For example, the provider can specify an office hour block every Tuesday and Thursday, from 3 pm to 5 pm, with every appointment being at least 15 minutes but no more than 45 minutes long. A textbox on the dialog window will allow the user to specify a set of instructions that are automatically sent to anyone who makes an appointment with the user. For example, a counselor might specify that every student bring a copy of their latest transcript to every appointment.

Group sessions have the capabilities of office hours but are for a set time and limit the number of students who can attend. The creator of the group session can determine if students can see the list of students who have signed up to attend the group session.

The list of upcoming appointments will list students who have scheduled a meeting during office hours with the provider, the time of the appointment, and the major reason for the student having scheduled a meeting. The list of status changes presents appointment changes or flag changes for students. For example, if a student chose to cancel an appointment or if a new appointment was made, a notice would be added to this list of recent changes. Flags can be displayed on the list of recent changes. If a flag was raised by a provider with regards to a student, then the student's name and the flag type would be displayed. Finally, a list of all flagged students will be presented on a panel, with the corresponding reason for flagging displayed along with the students' names. Several filters can be applied to the list of flagged students, such as display flags raised by the system, display flags related to financial issues, among others.

The appointments module for the provider interface includes several views that are typical of calendar applications: agenda view, day view, week view, and monthly view. The primary purpose of this module is to allow the provider to view and edit appointments made, and to specify and edit new office hour blocks and group sessions. The list of upcoming appointments will be interactive, allowing the provider to add, edit, or cancel an appointment. When the cancel appointment option is selected, a dialog window opens prompting the user to write a message explaining why the appointment is to be canceled. The explanation is then sent as a message to the corresponding student. Editing an existing appointment opens a dialog window similar to the editing appointment window on the student's dashboard, allowing the provider to override any of the entries by the student, with two additional features. First, the dialog window will include a label that includes the student's name. The student name label can be presented as a button or a hyperlink which redirects the user to the student's profile. The second feature is that an additional textbox will allow the provider to enter private comments for record-keeping purposes, which are subsequently added to the student's folder. The student's folder will be further discussed below. For example, the provider can add a private comment reminding the provider to discuss graduation requirements during the scheduled meeting with the student.

In all of the calendar views the provider can add an appointment by selecting one of the available entries, cancel an appointment, or edit an appointment. In addition, new office blocks can be added by interactively selecting the calendar. This functionality will be supported in all of the calendar views. The calendar view for the student and the provider dashboard can be implemented with the same set of core functionality for managing and editing appointments and office hour blocks, with the provider calendar view containing a superset of the student calendar view functionality.

Providers may also be given a role as a calendar manager for other users. For example, a department manager may be given the role of calendar manager in order to be able to schedule appointments for the department instructors. A role of calendar manager would allow for the adding and editing of appointments, office hour blocks, and group sessions for themselves and for any provider they manage.

When a provider selects a student's name, the provider will be redirected to the student's profile. The profile will display the information filled out by the student. When a provider views a student profile, options will be given for raising a flag, adding a note related to the student, inviting the student to make an appointment, or reporting that the photo uploaded by the student is inappropriate.

When raising a flag, the provider will be required to enter pieces of information as to why the flag is being raised. This enforces responsible use of the flagging system, and also keeps members of a student's success network informed when a change occurs. In the preferred embodiment of the present invention, a dialog window will open and require the provider to specify a flag type. The flag type is selected from a list of available flag types. The types of flags which can be raised are institution-defined and role-based, so that the set of available flags to instructors would be different than the set of flags available to residence hall staff or advisors. The flag types may include behavior concerns, financial concerns, work-life interference, poor attendance, dramatic change in appearance, group project problems, poor class participation, strange or dangerous behavior, etc. Other information which might be required, depending on the academic institution's standards, are additional notes indicating why the flag is being raised and the course on which a student might be encountering difficulties, if applicable. For example, if a student gets lower than a 60% grade on an exam, the course instructor can search for the student's name, visit the student's profile, select the flag button displayed on the student's profile, and enter a note regarding the need for the student to visit the instructor during office hours and to suggest to the student to visit the tutoring center.

Every flag documents to the person raising it whether the information contained in it is available upon request to the student through FERPA regulations. This ensures appropriate documentation about the concerns.

In the preferred embodiment of the present invention, when creating a note related to a student, the provider is first asked to specify the note type which is institution-defined and based on the role of the user. Note types can range from being a general student comment, a major selection note, a financial issue, etc. The provider can specify the current date, a subject line, the related flags, and privacy of the note. Finally the provider can enter notes in a textbox. In another embodiment of the present invention, the note dialog includes a list of all flags associated with the current student. This allows the provider to specify whether a note is related to any of the existing flags. Each note can include a privacy setting. The privacy setting relates to who can view the note created by the provider. If the note is set as private, then the note can only be viewed by the provider who created the note. The note can also be set as shared, allowing a specific set of other providers to view the note as well based on the type of note. This is one way in which the progress or the status of an at-risk student can be monitored by several entities, even though each entity might play a different role and have a different association with the student. When creating the note, the provider will be notified whether the information entered will be available upon request to the student through the FERPA regulations.

The students module on the provider dashboard allows the provider to search and view students. The information displayed for each student will depend on the institution's preferences, and can be changed by the administrator of the system for the institution. The information will primarily include the flagging status of students, contact information, the primary reason for a flag having been raised, if any, the provider name who raised the flag, etc. The instructor will be able to view the list of students using a variety of filters. For example, the instructor could view all flagged students, or view all students with manually set flags, or view students who were flagged because of financial concerns. The list of students can also be filtered by a specific term, such as Spring 2009, or alternatively the list can display all available students. Students can also be browsed based on a specific note type, such as viewing students who have note types for attendance problems. In another embodiment, students can be listed based on a number of outstanding invitations, students who have not visited the provider in the current semester, or students with specific grades or grade averages. Search capabilities of this student list can also be included. Selecting any student's name redirects the user to the selected student's profile.

The engagement module in the provider dashboard allows the instructor to analyze his/her engagement performance with students. In one embodiment of the present invention, the instructor would be shown a success provider score, which would provide the instructor with a sense of how well the instructor motivates and improves the effectiveness of students at various levels. The success provider score could be a number, between zero and 100, it could be a letter grade, or it could be presented using a graphical representation, such as a green circle for a high score and a red circle for a low score.

The actual criteria and the corresponding weight values used for the success provider score or performance data will depend on the requirements and goals of the academic institution. The manner in which the success provider score is computed will also be configurable by the academic institution, allowing the administrators to specify the criteria and their relative importance in accordance with the standards of the academic institution. In one embodiment of the present invention, activities performed by the provider would be used to determine the success provider score. For example, the success provider score could be computed by the number of student endorsements or positive reviews received by the provider, the number of appointments made, the percentage of students whose grades increased after meeting with the provider, the percentage of students who met with the provider and graduated, and the percentage of students who met with the provider and followed by using the services recommended by the provider. All of these respective values could then be uniformly scaled and weighted accordingly based on their relative importance, with the weighted sum providing the success provider score. In another embodiment of the present invention, the success provider score could be computed using a set of conditional statements. For example, a provider could only get a high success provider score by meeting with at least 10 students per month, or a provider could get no higher than a 50% success provider score unless students in certain protected classes met with the provider once every two weeks.

The instructor would also be provided with a set of specific tips for increasing the comfort level of the instructor's student, such as uploading, discussing personal interests, adding more office hour blocks, including more student endorsements, etc. Statistics will also help the instructor determine areas of improvement, and students who the instructor needs to reach out to. Breadth statistics would present the number of students and a list of students that have not been seen by the instructor in the current or prior terms.

Even without developing a success provider score per se, the present system makes it possible to analyze performance data related to different entities using the system and to compare performance data for a first entity to a second entity. The performance data could be based on data from a number of different sources, such as the engagement reported by the networked computer system related to an entity's interaction and assistance provided to students (such as meetings scheduled, meetings held, referrals made to students for other services, improvements in the students' grades or performance or mental health, etc.), academic data pulled from course management systems (such as course dropped or completed, academic advisement, grade improvement or decrease, student retention rates, etc.), and student activity data pulled from student management or information systems (such as tutoring sessions held, counseling or advisement sessions held, clubs joined or quit, and many other types of activities). While the performance data could be determined by each academic institution or within various groups (departments, colleges, etc.) within the academic institutions, the performance data would likely be more useful if the same performance criteria applied to all entities so that the first entity could be evenly and fairly compared to the second entity at all times. Such performance data could be based on the engagement, the academic data or the student activity data or some combination of each.

The entities could include two different academic institutions, different providers within an academic institution, all of the providers within one department compared to each other or collectively compared to another department, all of the providers within one college compared to each other or collectively compared to another college. Any of these comparisons would enable the first entity to determine how it was doing at helping students in comparison to the second entity, and then delve down deeper into the data upon which the comparisons are based to determine how to improve performance. Likewise, a provider would be able to compare the provider's current performance to performance from prior terms. This would allow a provider to assess whether the use of a particular engagement technique improved overall student performance from one semester to the next. A provider's performance could also be compared to those peers who have the highest broader student success, enabling the provider to identify techniques that yield the best results with regard to student engagement and student success. As correlations are developed between referrals to other providers, problems/flags, and student demographics, higher scores will be given to providers who follow the most effective route, or who adhere to best practices.

The diversity of the students using, and subsequently those students not using, the office hours can be analyzed by various demographics. For example, a department might be trying to encourage further enrollment of students belonging to underrepresented groups. In this case, each instructor would be able to determine whether students belonging to an underrepresented group might be less likely to see the instructor outside of the classroom during office hours. Statistics can also be included that show the impact the involvement the instructor has had on students. For example, a chart can show the impact on grades of students who visited the instructor versus those students who did not. The results for each of these respective statistics can be further analyzed by race, gender, department, athletes, and country of origin.

Another useful tool of the engagement module is the ability for an instructor to analyze the levels of academic performance of students in the instructor's courses. This can allow providers to determine patterns of various student groups, demographic and academic characteristics. For example, an instructor can determine how often students with a GPA lower than 3.0 and enrolled in the instructor's class have scheduled an appointment during the current semester. Alternatively, the instructor could also see visits by grade average in the course in the current or prior terms. The instructor will also be presented with a set of tools for tracking students at risk. Some of these tools include viewing students who have been flagged as at-risk, viewing appointment notes, viewing students with poor overall or individual grades, etc.

The engagement module allows the instructor to view and generate a variety of reports related to personal engagement and motivational success of students, including appointment reports, student reports, outcome reports, demographic reports, trend reports, etc.

The profile module in the provider dashboard consists of several screens, including an institutional profile screen, an appointment preferences screen, a listing of courses, and an email notification screen. The institutional profile allows the provider to edit a personal profile. The instructor can upload a photograph, specify general contact information, and miscellaneous information such as a biography and how a student can be helped by visiting the provider.

The appointment preferences allow the instructor to specify a set of default settings for office hour blocks. However, the specific settings for an office hour block can always be changed when creating an office hour block. Some examples of default appointment settings include the minimum appointment length, a scheduling deadline, and locations for the meetings with students. In addition, a calendar manager can be added which would allow another person to set or change appointments for the instructor. For example, a department administrator might be the calendar manager for all the department instructors in order to be able to schedule meetings for the instructors related to advising.

The list of courses presents the instructor with all the courses for which the instructor is responsible. In the preferred embodiment of the present invention, students enrolled in a course taught by the instructor would be able to schedule appointments with the instructor during office hours. In the courses area the standard course meeting times will appear or be entered by the instructor. These will be used for taking attendance.

The email notifications screen allows the instructor to specify preferences for appointment and flag notifications. The appointment notifications relate to reminders for appointments. The flag notifications cause an email to be sent whenever a flag is raised or cleared. The frequency of notifications sent can also be specified.

FIG. 1 shows the three components that interact as part of the Starfish system. The Starfish system 100 hosts the services provided to the academic institution 102 for student retention and users enrolled with the academic institution. The academic institution provides a set of services to its users, some of which are used for managing the operations of the institution, such as course management systems and student information systems. The user's pc 104 (which includes the WINDOWS, MAC, and LINUX operating systems, among others) is used by all end-users to access both the Starfish system services and the services provided by the academic institution. The end-users include students, providers, and administrators.

Figure 2:
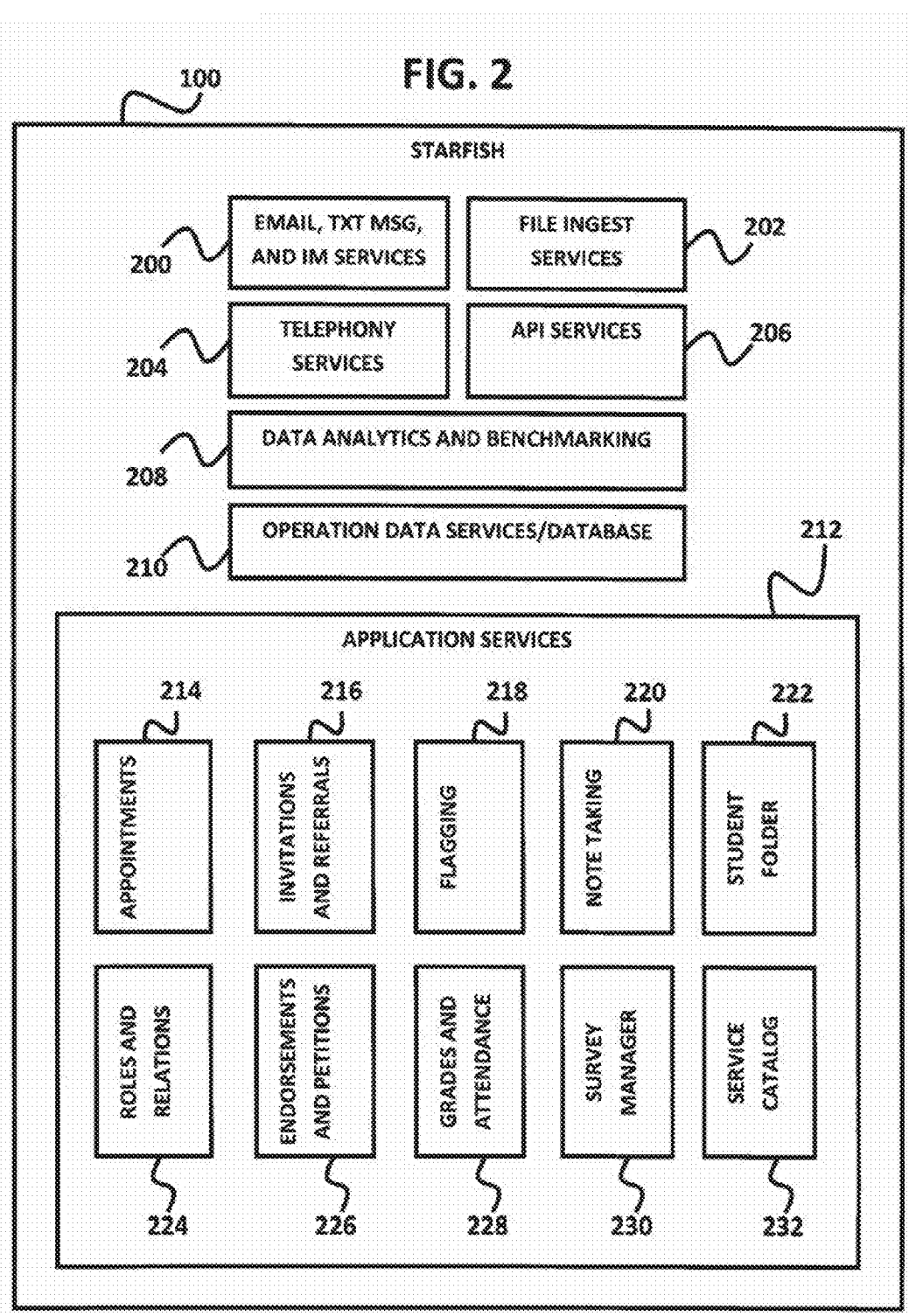
FIG. 2 is a block diagram illustrating the overall structure of the present invention.

The Starfish system 100 consists of centrally hosted collections of servers and services accessed by the academic institution providers and by both current and prospective students. FIG. 2 shows a high-level diagram of the Starfish system 100. Starfish system 100 provides a set of services, including: email, text messaging, and instant messaging, 200; file ingest services 202; telephony services 204; API services 206; data analytics and benchmarking 208; operation data services and a database 210; and a suite of application services 212.

The file ingest services 202 provide the capability to store and process data files generated by academic institutions in order to extract the critical student activities. These data files are automatically generated by Starfish system adapters and created via ad-hoc means at the academic institution.

The telephony services 204 provide the ability to call out to students about upcoming appointments and situations that need their attention, as well as an inbound capability to allow students and staff to schedule appointments via the phone or voice over Internet Protocol (VOIP).

The API services 206 provides third party programs and systems a set of application programming interfaces (APIs) that enable a variety of capabilities, from seamlessly integrated systems to remote reporting.

The data analytics and benchmarking 208 provides a cross-academic institution analysis and reporting capability that compares and contrasts the behavior of students at different academic institutions that have implemented the Starfish system 100 and looks at trends over time. This is another key feature of the present invention, in that benchmarking is done on an operational systems basis. In contrast to existing systems, the Starfish system 100 surveys are very specific and any corresponding results can be benchmarked against other academic institutions. In existing systems, features which tend to be tested by surveys focus on student advisement and mentoring. With the Starfish system 100, the data that is analyzed and benchmarked is taken from all the data and activities tracked by the course management system and the various student information systems hosted by the academic institution, as further discussed in reference to FIG. 8 below.

The operational data services/database 210 provides the basic data storage and access capabilities for all of the academic institution data used in standard end-user transactions.

The application services 212 provide the end users (students, instructors, advisors, parents, administrators, etc.) with the web-based capabilities of the Starfish system 100. The set of application services 212 include: appointments 214, invitations and referrals 216, flagging 218, note taking 220, student folder 222, roles and relations 224, endorsements and petitions 226, grades and attendance 228, survey manager 230, and service catalog 232.

One aspect of the present invention provides the ability for students, and others, to schedule meetings or appointments 214 with members of the academic institution. Pre-set times, called Office Hours, designate when meetings should occur and keep track of whether meetings occur. The provider of the academic institution with whom the appointment was made can make notes 220 about issues discussed during the meeting. These notes can then be shared with other providers of the academic institution who might be part of the student's Success Network and flags can be set.

If a student does not show up for the appointment the instructor, advisor or counselor can mark the student as a "no show." The system could also be configured to always assume no shows for some types of appointments, with the advisor subsequently marking that a student attended the appointment. The system will track and report against no shows. Different combinations of communications will be tracked to determine what minimizes the no show rate. This communication style will be encouraged by the system.

Another model for compelling or coercing an appointment is through the use of invitations and referrals 216, which have the ability to encourage or force participation. Invitations provide the ability to invite students to meet with a member of the academic institution, either individually identifying the student, or selecting students that meet some criteria, such as all students, all students with a C average or below, etc. Referrals allows staff to request that a student seek help from a service on campus, such as writing center help or disability services help. The system notifies all parties of the need for the student to visit the service and tracks that it happens. If deadlines are not met for either of these capabilities, reminders will be sent out and escalation procedures that get other parties to intervene can be initiated. These are examples of models for compelling or coercing an appointment, in that the system provides a status and sends corresponding updates to related parties and continues to apply pressure in a variety of ways until the visit/meeting happens, or other actions are taken.

In the preferred embodiment of the present invention, two types of flag definitions and management capabilities are provided for flagging 218: manual flags and automatic flags. Manual flags are raised by people who interact with the student when they observe a problem or by the students themselves.

Automatic flags are initiated when the events known by the Starfish system 100 about a student cause a flag rule to trigger. In one embodiment, the identification of students to be flagged is done using a set of conditional statements. For example, if a student's average in a class falls below 70% or if a student withdraws from a class after the add/drop period, a flag could be automatically raised, depending in institutional preferences. For every student currently enrolled in an academic institution, the system could analyze all data associated with the student, this data aggregated from the course management system, other student management or information systems, and the student folder. A set of conditional statements could then be used to determine whether the student falls within the criteria of one or more flags. Alternatively, a statistical analysis could be used to determine whether a student should be flagged. For example, Biology students who fall within two standard deviations of the average GPA for freshman students in the Biology department may be flagged to meet with an advisor or to attend tutoring. The probability distribution of student scores for a test in a class may also be used to identify and flag students in the class who need to schedule an appointment with the class instructor or teaching assistant. Statistical analysis techniques that could be done on the data from course management systems and other student information systems are well known in the art.

Once flags are raised or created, a variety of people are notified based on the flag type and the student. Based on flag types, students can be directed to interventions. Requests for more information about the students are sent to each student's network. Advisors and counselors are notified to start interventions. The provider who first raised the flag can be subsequently provided with positive feedback about their action to motivate them to continue to be actively engaged with the success of students, thus closing the loop. The flag is tracked, commented on, and used as a shared focal point for the community focused on a particular student.

A unique simple ownership mechanism allows for flexible options between group ownership of flags and the resolution of flags, individual ownership, or switching between those modes. Ultimately flags can be closed through addressing the issue or having the student withdraw from the class or institution. Throughout the lifecycle of a flag, the provider who raised the flag can be provided with opportunities to be informed of the student's status, without divulging too much confidential information, further encouraging the behavior of the providers of identifying students at-risk.

As noted above, note taking 220 provides for the ability to record personal or shared notes. Notes are typed in order to structure the required information for the notes and to determine the access levels to the notes for various people in the student's network. Notes can be stand alone, associated with appointments, or associated with one or more flags. Notes can be emailed to people within the student's network or the student themselves. Emails initiated by the system about a student, or to the student, are automatically captured as notes.

The student folder 222 provides a student-centered view of all information that the Starfish system 100 knows about and all actions possible for a student. From here a user who has access to a student's data can see, based on their role, all information on that student. The information can be both chronologically organized as well as by the type of information. The chronological display shows everything about the student organized by time. For example, when the student registered for classes, when they turned in their assignments, when they got their grades, when the grades raised a flag, when they missed class for a week, when they met with their instructor, when they were requested to meet with their advisor, when they missed or cancelled a meeting, what comments a financial aid advisor had about their phone call, when they withdrew from the class, etc. This will enable a quick diagnosis of students at-risk. Similarly a user can see contact information for a student, their picture, and that they changed majors a few times. The user can also see all of their grades and the day they get them in class. They can see and raise flags. They can see and take notes. They can see and take attendance. All of this student information results in a case history for the student, not limited to academic advisors or admission officers on their own.

A key component of what makes the Starfish system 100 so usable is its ability to provide the right information to the right people at the right time. This happens through roles and relations 224. Starfish system 100 provides a custom role management system that balances flexibility with complexity specifically for the higher education market. It provides predefined roles, extensible roles, customization of privileges associated with roles, role-based access to resources, and role display to orient each party to how the community is helping students. It can support such roles as Student, Instructor, Advisor, Parent, Residence Hall Staff, Dean, Coach, with a predefined set of rules about their activities and access to student information. Further roles can also be defined by the administrators of the academic institution, as long as each role is accompanied by the corresponding rules and access privileges.

Once roles have been defined, the academic institution can specify the relations. Relations specify associations between users. For example, an instructor's role would allow for the viewing of a student's record, the setting of appointments with a student, note taking, and flagging, while a tutor's role might only allow for the setting of appointments with a student and flagging. A variety of relations can be specified that represent today's practice in higher education. The relations definition approach includes: automatic relation assignment based on roles within a course management system; automatic relation assignment based on other online communities, such as an advising community or departmental community; batch upload of relations including meta relations where someone can have relations with all students, students in a department, or students in a department based on their last name (e.g. a-f, g-k, l-z); and manual entry of relations. Relations are organized around academic terms, such as Fall 2009. Every relation in the system will be constrained by one or more terms.

The manner in which roles and relations are structured and managed shows an example of the non-passive, engagement focused nature of the present invention towards students. To the student it presents them with the people who can help them. To members of the student's success network, it presents people who are helping or who could potentially help a specific student. Techniques for implementing roles and relations in software are well known in the art. For example, a Starfish system instructor could be someone that can or teaches a course section of students, while a Starfish system user is someone who could or is enrolled in a course section of students. Other roles could be defined as necessary, such as an appointment taker, an appointment maker, and an administrator. A set of privileges would then be associated with each respective role. For example, an administrator role would have the privileges to change all settings of the Starfish system and to see all data collected by the system. A student role would be allowed to see the student's own information and to make and request appointments with providers, while a provider role would be allowed to see the information of students associated with the given provider. The set of privileges, and the defined roles, can be edited and new ones added as needed by the administrator of the Starfish system. The relations could also be used to build a student's success network, for handling the sending of flagging notices, and for directing students to services that can help them succeed.

Endorsements and Petitions 226 provide information to and from students to allow the students' collective experience to drive student behavior. For any individual or service, for which a student is authorized by the academic institution and the individual/service, a student can provide an endorsement of the collaboration the student had with the individual or service in order to promote another student to visit/meet with the individual or service. These endorsements are provided at the time appointments are booked as well as generally in the profile of the individual or service so it has the best impact. Similarly the student is also presented a roll up of how other students like themselves are meeting with the individual or service. For example, if a female, first-year biology student is planning on making an appointment with a financial advisor on the current week, the student can be presented with an endorsement stating that five other female, first-year biology students have met with a financial aid advisor during the same week or the previous week, thus making the student feel more comfortable with the service. Petitions provide a voice for students to anonymously recommend an instructor or advisor to use the Starfish system 100 in order to enable the students to have self service for scheduling appointments, contacting the instructor or advisor, etc. Student demands have significantly impacted the use of course management systems at academic institutions. Starfish system 100 also provides a means for organizing and automating this demand.

The Grades and Attendance service, 228, provides authorized users access to data about a student's current and former academic performance. Current and historic grade data from the course management system can be provided or updated daily. In addition, official grades from the registrar can be provided to the authorized user, including GPA, GPA for major, scores of any placement test or standardized tests for the student, etc. Attendance provides instructors a web-based attendance recording system that can show pictures of students enrolled in a course. The instructor could then arrange the pictures of students to match the classroom layout or in some other manner for quick data entry. This attendance data then feeds into the flagging system to detect when students are missing or are late for a certain number of classes. The system could also use the official course time to remind instructors to take attendance, and notify an administrator if an instructor fails to record attendance for a course. Administrators could then prompt instructors with email reminders in order to enforce the recording of attendance.

The survey manager 230 service provides the ability to specifically survey students about their attitudes and experiences in order to provide profile data for students and raise flags of concern. It also enables surveys of instructors to raise flags for students at pre-defined times. Lastly, it provides feedback about service delivery for quality improvement.

The service catalog 232 provides a single, searchable location for students to learn about the individuals and services that can help them. Each student is provided upon entry to the Starfish system 100 with a personalized Success Network that lists contact information to enable online scheduling of meetings with anyone who the academic institution has specified can help the student. This list typically contains current and former instructors and teaching assistants, advisors, mentors, and any counselors for this student. The service catalog then contains the larger set of services a student can access, from disability services to tutoring. Each service can allow for online scheduling, endorsements, contact, and general information. Services can be added to and removed from the student's success network. Advisors and other authorized personnel reviewing a student's folder will see the student's Success Network allowing for a quick connections between people who help students.

Figure 3:
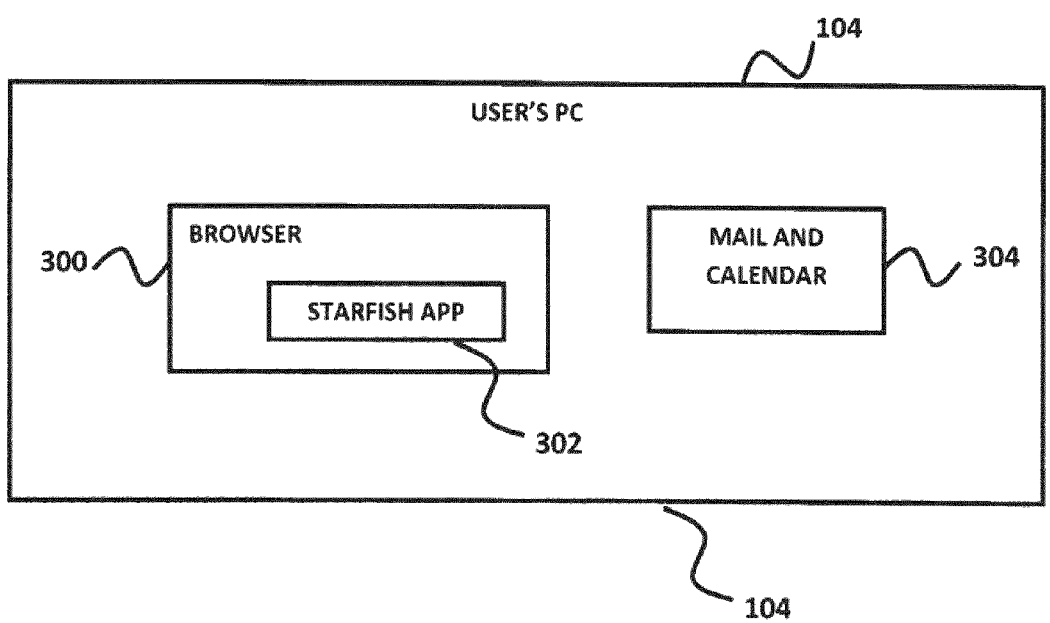
FIG. 3 is a block diagram illustrating how the user's computer of FIG. 1 specifically interacts with the present invention.

FIG. 3 shows the user's PC 104 and the utilities used to access Starfish system 100 in the preferred embodiment of the present invention. The user can use the web browser 300 to access the services provided by both Starfish system 100 and the academic institution 102, such as the course management system used by the institution. The Starfish application 302 is an AJAX-based application that runs partially within the user's browser via JAVASCRIPT, although many other implementations are possible. Certain services from Starfish system 100 and from the academic institution 102 might interface with the mail and calendar 304 applications on the user's PC 104. For example, a user might access email from the academic institution 102 via MICROSOFT OUTLOOK or through some other email client on the user's PC 104. In addition, the appointments application from Starfish might synchronize with the calendar on the user's PC 104. The synchronization is performed in both directions, in that appointments made over the web within office hour blocks are sent to the user's personal calendar, and changes made in the user's online calendar (including GMAIL and OUTLOOK) can then be synchronized with the Starfish system. A user who deletes or modifies a system-created appointment in OUTLOOK will have the corresponding email sent from OUTLOOK read by the system. The system will then update its databases and communicate out to affected parties. In addition, the calendar application can be used to make appointments, and lists of flags recently raised and appointment alerts can be received via email.

Figure 4:
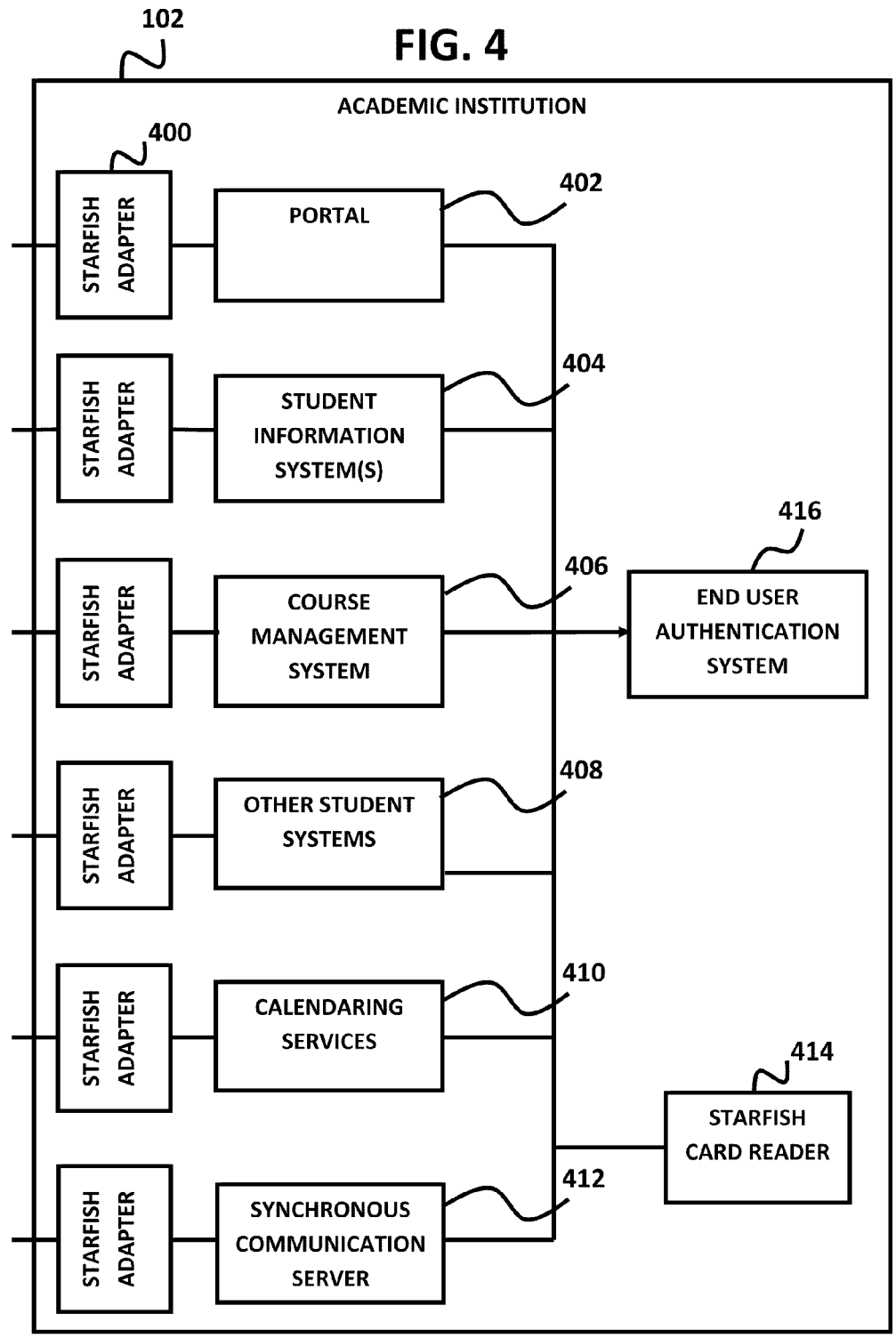
FIG. 4 is a block diagram illustrating how the present invention specifically interacts with an academic institution.

FIG. 4 shows the services provided by the academic institution 102. Existing services provided by the academic institution can be interfaced with Starfish system 100 via adapters 400. A Portal 402 provides web-based access to content and services. Starfish system 100 is accessible from the portal 402 via a single login and enables the Starfish system 100 to mine other academic institution 102 systems and services for data about student activity.

A course management system 404, a student information system(s) 406, other student systems 408, calendaring services 410, a synchronous communication server 412, a Starfish card reader 414, and an end-user authentication system 416 are also provided. The end user authentication can be LDAP, ACTIVE DIRECTORY, or other systems. Examples of a portal 402 are MICROSOFT SHAREPOINT or SUNGARD LUMINUS. Examples of course management systems include BLACKBOARD; WEBCT; MOODLE, an open-source course management system; ANGEL; and DESIRE2LEARN.

Student information systems 406 consist of services hosted and provided by the academic institution to students and also used to help manage administrative tasks of the many institutions and services provided to the student body. For example, student information systems are used for back office admissions, scheduling, transcripts, among other student self-service functions. The Starfish system 100 learns administrative information about students, staff, and courses by mining the corresponding student information systems for data related to student activity. Examples of student information systems 406 include BANNER UNIFIED DIGITAL CAMPUS BY SUNGARD or DATATEL COLLEAGUE. BANNER UNIFIED DIGITAL CAMPUS provides an administrative suite of student, financial aid, finance, human resources, and advancement systems. DATATEL COLLEAGUE provides a similar set of planning and management solutions for academic institutions.

Examples of other student systems 408 include a judiciary system and residence hall management systems. These systems track students' actions, students' activities, and any administrative data about students. The Starfish system can mine these student systems for data to learn further information related to students. For example, the Starfish system can determine by examining the data of these systems the name of the resident assistant of a student, or whether a student was involved in an incident with the campus police, or whether a student is part of any clubs or organizations at the academic institution.

The calendaring services 410 provide calendaring capabilities for members of the academic institution. This could be dedicated for the academic institution, a locally hosted exchange server, or a global service used by campus members, such as GOOGLE Calendar, or both. The Starfish system 100 ensures it is up to date with student appointments relating to student success through a two-way messaging system.

The synchronous communication server 412 provides real-time text-based chat and audio between campus members. The Starfish system 100 will refer individuals to this service to engage in an online meeting and then capture the transcript of the meeting for the student's folder.

The Starfish card reader 414 will read student and provider ID cards to authenticate the user so that they have a quick way of checking into an appointment or seeing a list of providers available to serve them at a center. Many other forms of identification authentication could be used in place of the card reader 414.

The end user authentication system 416 validates user name and password combinations for multiple services for an academic institution. Academic institutions' information technology uses this to simplify the number of username/password combinations a user has and how many times they need to log in to get secured access to hosted services. FIG. 4 shows how in the preferred embodiment of the present invention, all of the services provided to members of the academic institution, students and providers, are authenticated via the authentication system 416 so a user only has to log in once to have access to all of the systems and services.

The Starfish adapters 400 handle the data mining and the transmission of data collected to the Starfish system 100. In case of user authentication, either through the course management system 404 or the portal 402, the authentication information for the user is securely transmitted via the Starfish adapter 400 as well.

Figure 5:
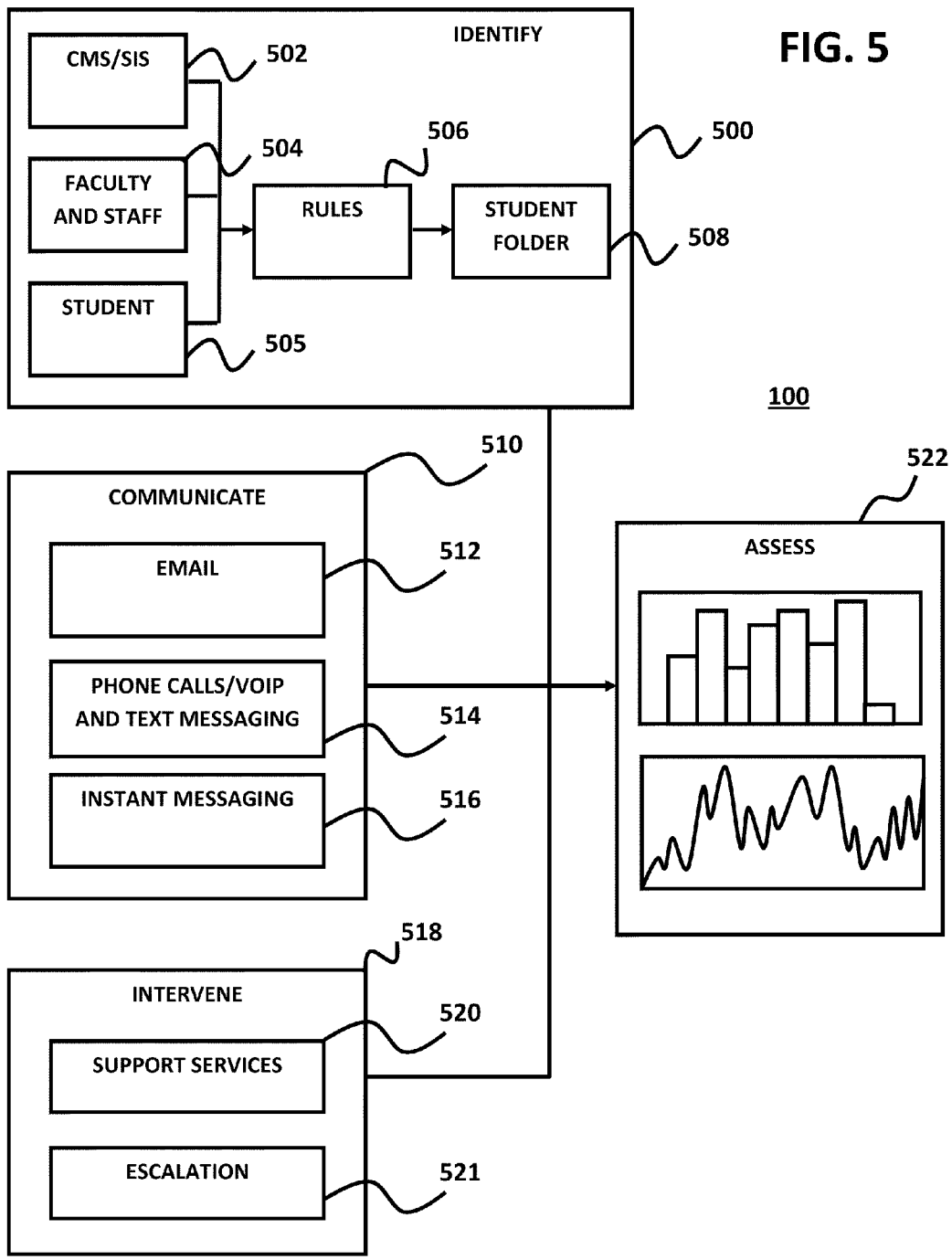
FIG. 5 is a block diagram illustrating major components of the present invention.

FIG. 5 shows a system architecture of the preferred embodiment of the Starfish system 100. There are four main components of the system: identify 500, communicate 510, intervene 518, and assess 522. The identify component 500 begins by either automatically flagging students by data mining the CMS/SIS 502 or by having providers 504 manually flag a student. A student 505 may also identify himself or herself as having a problem or needing help by manually raising a self flag. Automatic flags are raised based on a set of rules 506. For the automatic flagging, the rules 506 will depend on the academic institution's settings and are fully customizable, but may range from flagging students who drop below a certain grade average to students who miss attendance two consecutive days. Manual flagging will be up to the discretion of the providers 504, but will depend on the academic institutions student and intervention policies, such as flagging a student who stated financial problems during a scheduled office hour appointment. Any flag raised about a student is subsequently added to the student folder 508, as are any related notes.

The second component of the Starfish system 100 is the communicate component 510. The communicate component 510 is what encourages or compels active participation and communication between a student and the student's success network. To the student it provides self-help services, while to the providers it allows them to identify and actively reach out to students at-risk. This active communication between the student and the service provider is supported by various media, including email 512, phone calls/VOIP and text messaging 514, and instant messaging 516. All of these can serve for the automatic delivery of alerts and reminders, in addition to standard message communication between the student and the success network. Alternative embodiments of the present invention include online delivery of help, anonymous telephonic delivery of help, phone-based reminders, student ID scanning, paper scanned surveys, PDA-based surveys, and help content offerings.

The third component of the Starfish Early Alert system is the intervene component 518, which builds on the encourage/compel aspect of the communicate component 510. In this step, the student, after having been identified, is directed to a set of support services 520 which can help the student at-risk to address the problems affecting the student, such as visiting a tutor, a counselor, or financial advisor, depending on the nature of the problem. The intervene component 518 also includes an escalation procedure that can be implemented in different ways by the academic institution 102 to make sure students get the help they need and providers are providing such help, as further described above.

Finally, all activity and progress related to a student on each of the three components of identify 500, communicate 510, and intervene 518 is recorded and analyzed by the assess component 522. This allows the providers and administrators to assess trends, usage patterns, how successful services are in improving student grades, etc.

Figure 6:
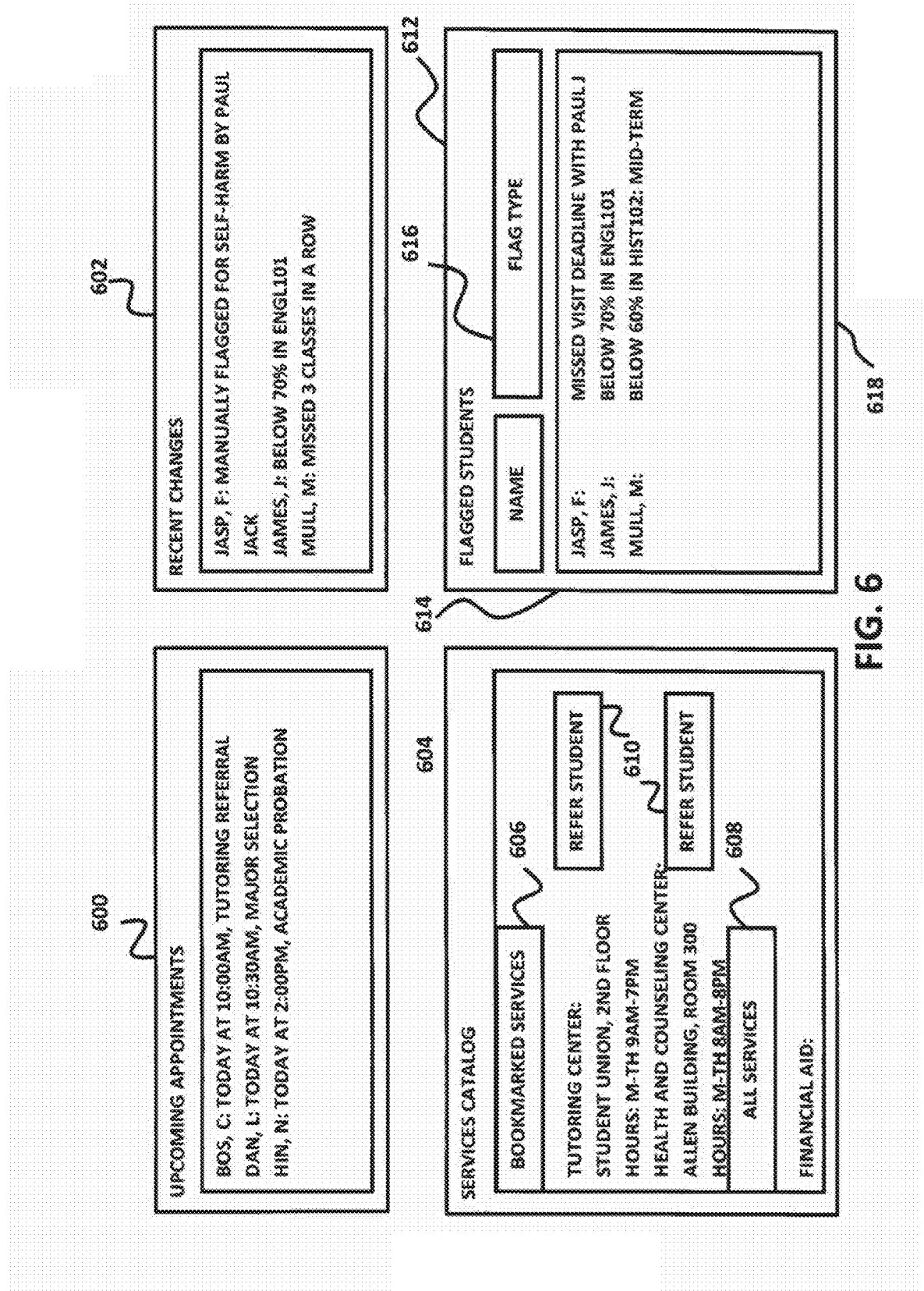
FIG. 6 illustrates some of the user interface panels of the present invention visible to a provider.

FIG. 6 shows an example interface of the Starfish system 100, as seen by a provider of the academic institution 102. In the preferred embodiment, the user interface would display a panel for upcoming appointments 600; a panel displaying recent changes 602, such as recent flags for students that have been set or cleared; a panel displaying the services catalog 604; and a panel displaying a list of flagged students 612.

The upcoming appointments panel 600 displays a list of students who have scheduled appointments with the provider, including the student's name, the appointment date, and the primary issues to address during the appointment. The appointments list can be scrolled by the provider in case there are numerous appointments which have been scheduled. In another embodiment of the present invention, the appointment list can be sorted by any of the fields which describe the appointment, such as by student name, date, or by the appointment reason.

The recent changes panel 602 presents to the provider a list of students whose flagging status has changed for the current day. The list of students can display primarily the name of the student, and the primary reason for the student being flagged. The changes displayed on the recent changes panel 602 can be customizable with default settings at the administrative level, and also further customized by the provider. For example, the administrators of the academic institution may set the system so that only newly flagged students from the current day are displayed on the recent changes panel 602, but a provider may change this default setting so that the recent changes panel 602 displays newly flagged students since the last log in.

The services catalog panel 604 presents a services list provided by the institution 102. In the preferred embodiment, the services list would be divided into two sections: bookmarked services 606 and all services 608. Services frequently used by the provider can be bookmarked for future access, which would subsequently be added to the list under the bookmarked services 606, which can be later edited by adding and deleting bookmarked services. The services catalog 604 can be searched, and any service can be referred to a student if appropriate via a button or link 610. The referral to a student can then bring up a list of all students who are associated with the provider, a list of students who have been flagged, or an email template. This is an example of how a teacher can actively engage a student who has been identified as at-risk.

Roles and relations can be used to present a provider with the list of students who are associated with the provider. For example, if a provider had an instructor role, then a list of all students in the instructor's course sections could be presented to the provider. The list of students could also be divided into subsections, where each section of the list of students represent the different relations the provider has with different groups of students. Using the same instructor role example, the list could be divided by students enrolled in course sections taught by the instructor, allowing for this list to be further subdivided by each course and by each corresponding section; students for who the instructor is their primary advisor; graduate students who work under the instructor; and students who have been referred by other providers.

A list of all flagged students is displayed on the flagged student's panel 612. The panel list of students 618 would display the student's name 614 and the corresponding flag type 616 currently associated with the student. In an embodiment of the present invention, the information displayed for each student can be customizable with default settings at the administrator level, with further customization by each user. In addition, by toggling each field, such as the name 614 or the flag type 616 fields would sort the student list 618 according to the toggled field, either in ascending or descending order.

Figure 7:
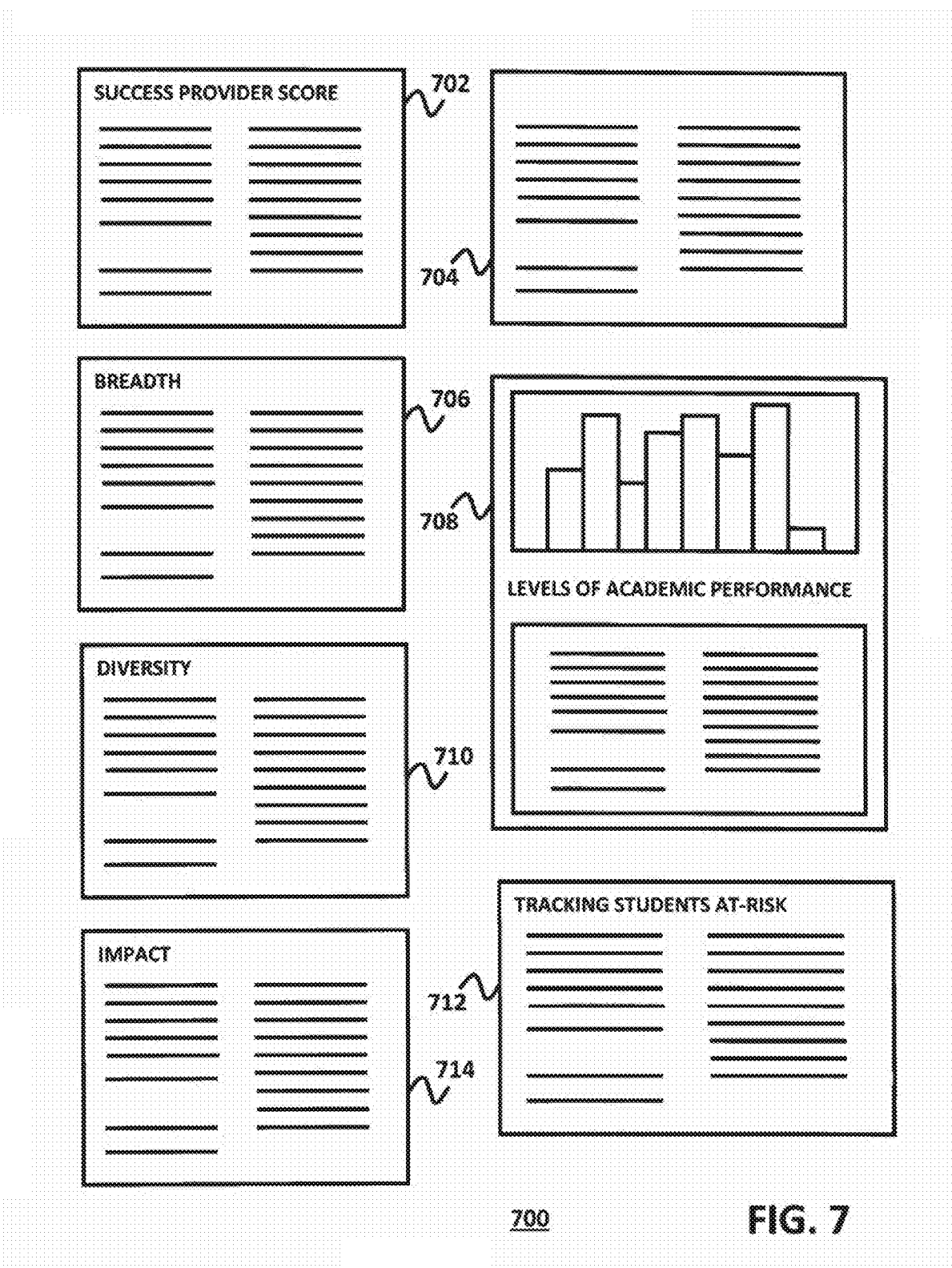
FIG. 7 illustrates the user interface panels of the present invention visible to a provider for viewing analytics.

FIG. 7 shows an example interface 700 of the preferred embodiment of the present invention that illustrates the provider interface for viewing analytics on data collected and analyzed, including feedback on levels of engagement relative to any benchmarks. The success provider score 702 is a score given to the provider based on the provider's participation with students and based on how a provider's participation subsequently affects student performance. It serves as an incentive to the providers, showing them that their proactive actions and help towards students make a difference, as previously discussed herein. An information and shortcuts panel 702 can present the provider with introductory information to the various analytics and reports presented in the interface page 700, along with menu options for actions that could increase a student's comfort level with the provider, such as uploading a photograph and discussing interests. The breadth panel 706 provides providers with statistics and benchmarks with regards to the extent to which the provider has been able to engage with students, out of all students related to the instructor on the current or previous terms, through scheduled appointments. Panel 708 provides an analysis of the provider's impact on student grades. Diversity panel 710 provides a correlation of number of visits to student race, gender, departments, and other demographics. Panel 712 provides tools for tracking students at-risk, such as viewing students who are at-risk, reviewing notes, and raising flags. Impact panel 714 provides an analysis of the impact on the student on a per academic term basis.

Figure 8:
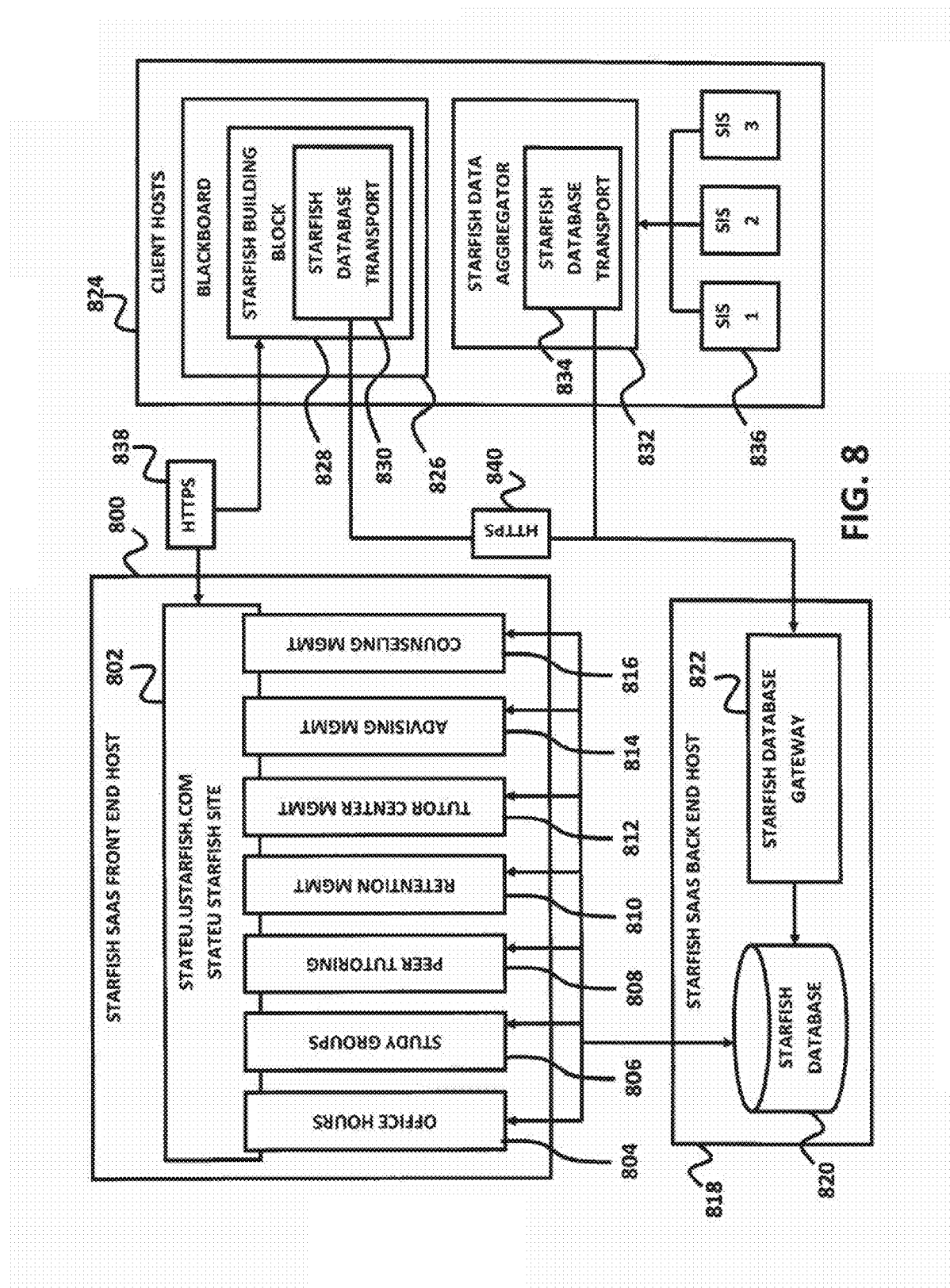
FIG. 8 is a block diagram illustrating an implementation of the student retention services suite of the present invention within an academic institution.

FIG. 8 shows a diagram of the preferred embodiment of the hosting architecture that enables the Starfish system 100. There are three main components to the hosting architecture, with two of them hosted by the provider of the Starfish system 100, consisting of the Starfish front end and back end hosting for the software as a service (SaaS), and a third component consisting of the client hosting system, which may be hosted by the academic institution 102.

The Starfish SaaS front end 800 hosts the student retention services suite for multiple academic institutions 102, with a specific institution highlighted, referred to as STATEU in FIG. 8. The Starfish website 802 ("STATEU.USTARFISH.COM") for the academic institution 102 is accessed either via single-login from the academic institutions' course management system by passing a login token to the Starfish system 100, or by logging in to the Starfish system 100 through a portal. The student retention services suite is accessed via the academic institution's Starfish website 802, with menu options available to access any of the services described above, including Starfish CONNECT 804, Starfish STUDY GROUPS 806, Starfish TUTORING 808, retention management 810, tutor center management 812, advising management 814, and counseling management 816. All of the actions and data generated from all of these services are subsequently stored and retrieved from the Starfish database 820, which is hosted by the Starfish SaaS back end host 818.

The Starfish TUTORING service 808 manages tutoring on campus via tutor recruitment, tutor certification, tutoring scheduling, supply-demand matching, meeting room management, and tutor rating and evaluation. The tutoring scheduling can be done similar to how students can schedule appointments with providers. Providers, or students given a special tutor role, would be allowed to post time blocks for tutoring sessions. The tutoring sessions could be individual or group appointments. In an embodiment, when the user with the tutor role is entering information for a new time block for a group session, the user will be given a list of available classrooms, or other rooms with special equipment, that are available for use at the specified time block. Alternatively, the tutor could submit a request to use a room, which can then be approved by the administrator or the staff in charge of the room.

The Starfish TUTORING service 808 would further allow students who have visited the tutor, or attended a group session hosted by the tutor, to rate and evaluate the tutor. The students would be allowed to rate on a scale, depending on the institution, such as from one to five. Alternatively, the students could provide an endorsement for the tutor by explaining how visiting the tutor resulted in a positive experience. In another embodiment, students would evaluate the tutors by completing an evaluation form, where the students would be asked questions ranging from the clarity and knowledge on the topic expressed by the tutor, to the appropriateness of the tutor's appearance.

In another embodiment, the student retention services suite would also include a mentoring service. This service would manage programs via mentor recruitment, mentor scheduling, mentor profiles, and would catalog mentors by industry, company, profession, and region. This service, by also keeping track of mentoring associated data, would enable administrators or other providers to assess effectiveness of mentoring programs.

The Starfish advising management 814 would allow the academic institution to deepen the impact of academic advising via degree audit, workflows for at-risk students, and social networking around majors. Surveys of participants would be conducted in order to gather feedback on the utility and experiences of the students, and as a measure of the success of the program. The advising management 814 would also analyze student data in order to find and determine correlations of attending advisement services and student grades, student satisfaction, and student graduation rates. In another embodiment, the advising management 814 would also support the benchmarking of outcomes against peers and aspirant institutions.

The client hosts 824 represent the academic institution's hosts, such as the academic institution's course management system. In FIG. 8, BLACKBOARD 826 is noted as a specific instance of a course management system used by the academic institution, and as incorporated into the preferred embodiment of the present invention as previously noted. However, any other course management system may be integrated with the Starfish system 100, as data integration is handled by incorporating a database gateway 822 on the Starfish SaaS back end host in order to enable different databases to integrate with the Starfish system 100.

As illustrated in FIG. 8, the Starfish system 100 integrates with BLACKBOARD 826 through the use of a Starfish building block 828, which handles authentication of users via single-login with the Starfish system 100 via a HyperText Transfer Protocol Secure (HTTPS) connection 838. HTTPS provides a secure HTTP connection by using either a secure socket layer or a transport layer security connection. Data collected from the course management system is then sent via a Starfish database transport 830 to be stored in the Starfish database 820, going through the database gateway 822 in order to allow communication between heterogeneous database systems. The data sent by the Starfish database transport is sent over an HTTPS connection 840.

The client also hosts a Starfish data aggregator 832. The data aggregator 832 collects data from a number of student information systems 836 hosted by the academic institution. The collected data is subsequently sent to the Starfish database 820 via HTTPS connection 840 by using the Starfish database transport 834, which handles the packaging of the data, the establishing of a secure connection with the Starfish database gateway, and the communication of the data. The data aggregator 832 could run as a background process, either as a service or a daemon. The data aggregator 832 could be scheduled to run at a predetermined time, running as frequently as every hour to once per day. The data aggregator 832 could also be manually executed through the administrator interface.

In an embodiment, one configuration of the system would prevent personally identifiable information (PII) from being sent to the Starfish SaaS front end host 800 and back end host 818, such information including a student's name, social security number, and student ID. The PII information would be kept within the academic institution client hosts 824, and a unique user identifier (UUID) would be sent instead to the Starfish SaaS front end host 800 and back end host 818. All information displayed to the end user's browser, through one of the interfaces or dashboards, containing any PII would be constructed by replacing the UUID with the PII from the academic institution. This process would limit the impact to the users and providers in case of a security breach of the SaaS front end host 800 and back end host 818.

While the present invention has been illustrated and described herein in terms of a preferred embodiment and several alternatives associated with various features, it is to be understood that the various components and features of the combination of elements described herein and the combination itself can have a multitude of different arrangements, uses and applications. Accordingly, the invention should not be limited to just the particular descriptions and various drawing figures contained in the specification that merely illustrate one or more preferred embodiments and applications of the principles of the invention.

What is claimed is:

1. A method for improving student retention rates in an academic institution through utilization of a networked computer system, comprising the steps of:
    analyzing data within the networked computer system input by one or more computerized academic management systems to the networked computer system and raising a first flag within the networked computer system whenever one or more students from a plurality of students are identified by data analysis as falling within a first set of at-risk rules;
    allowing one or more providers among a plurality of providers to raise a second flag within the networked computer system whenever the one or more students are identified by the one or more providers as falling within a second set of at-risk rules; and
    compelling a meeting through the networked computer system between the one or more students and the one or more providers to address one or more issues associated with the first flag and/or the second flag, wherein the one or more providers post a set of office hour blocks within the networked computer system and the one or more students schedule an appointment for a meeting with the one or more providers by selecting a meeting time from the set of office hour blocks, wherein the one or more students and the one or more providers are forced to address the one or more issues so as to improve a likelihood of the one or more students remaining at the academic institution.

2. The method as recited in claim 1, wherein the step of analyzing data includes the step of sending through the networked computer system an alert message to the one or more providers whenever the first flag is raised.

3. The method as recited in claim 1, wherein the step of analyzing data includes the step of sending through the networked computer system an alert message to the one or more students.

4. The method as recited in claim 3, wherein the alert message includes a service catalog.

5. The method as recited in claim 4, wherein the alert message includes a first service from the service catalog or a request for the one or more students to schedule an appointment with one or more providers.

6. The method as recited in claim 1, wherein the first flag is stored in a memory of the networked computer system in association with a student among the one or more students.

7. The method as recited in claim 1, further comprising the step of retrieving a list of first flags associated with the one or more students stored in a memory of the networked computer system, analyzing data input by the one or more computerized academic management systems and removing the first flag associated with a flagged student among the one or more students from the list of first flags if the flagged student no longer falls within any of the rules in the first set of at-risk rules.

8. The method as recited in claim 7, wherein a message is sent through the networked computer system to the flagged student when the first flag is removed.

9. The method as recited in claim 7, wherein a message is sent through the networked computer system to one or more providers when the first flag is removed.

10. The method as recited in claim 1, further comprising the steps of:
    associating within the networked computer system one or more notes that annotate the first flag and/or the second flag;
    sharing through the networked computer system the one or more notes and the first flag and the second flag with the one or more providers; and
    removing the one or more notes and the first flag and/or the second flag from the networked computer system in response to a command by the one or more providers.

11. The method as recited in claim 10, wherein the one or more notes have a privacy setting.

12. The method as recited in claim 10, wherein a message is sent through the networked computer system to the first student when the first flag is removed.

13. The method as recited in claim 10, wherein a message is sent through the networked computer system to the one or more providers when the first flag is removed.

14. The method as recited in claim 10, wherein the second flag is removed by the one or more providers if the second student no longer falls within any of the rules in the second set of at-risk rules.

15. The method as recited in claim 10, wherein a message is sent through the networked computer system to the second student when the second flag is removed.

16. The method as recited in claim 10, wherein a message is sent through the networked computer system to the one or more providers when the second flag is removed.

17. The method as recited in claim 1, wherein the step of analyzing data includes the steps of:

receiving data from the one or more computerized academic management systems;

applying the first set of at-risk rules to all data associated with a student among the one or more students;

creating a list of successfully matched rules for the student from the first set of at-risk rules;

storing the list within a memory of the networked computer system;

creating the first flag for one or more of the successfully matched rules on the list;

if necessary sending one or more alert messages to the one or more providers through the networked computer system; and if necessary sending one or more alert messages to the student through the networked computer system.

18. The method as recited in claim 1, wherein a student folder is stored in a memory of the network computer system for each student among the one or more students that includes the first flag, if raised, the second flag, if raised, and the meeting, if set, wherein a status change is made to the student folder when a change to the student folder occurs, and wherein one or more student related notes created by one or more providers from the one or more providers are added to the student folder when the one or more student related notes are created.

19. The method as recited in claim 18, further comprising the step of creating a success network through the networked computer system for each student among the one or more students, the success network including at least each provider among the one or more providers associated with the first flag, the second flag, and/or the meeting.

20. The method as recited in claim 19, wherein the status change causes the networked computer system to send an update message to one or more of providers of the success network.

21. The method as recited in claim 20, wherein the update message is sent to a type of provider among the one or more providers based on a set of provider roles and relations.

22. The method as recited in claim 21, wherein content of the update message depends on the type of provider.

23. The method as recited in claim 18, wherein the meeting includes tutoring, counseling, academic advisement, skill testing and/or mental health services.

24. The method as recited in claim 18, wherein a status change includes raising or removing a first flag, raising or removing a second flag, setting or cancelling the meeting, and creating or changing the one or more student related notes.

25. The method as recited in claim 1, wherein the step of allowing includes the step of sending an alert message to the one or more providers and/or the one or more students.

26. The method as recited in claim 25, wherein the alert message includes a service catalog.

27. The method as recited in claim 26, wherein the alert message includes a request for the one or more students to schedule an appointment with a referral provider or a referral service from the service catalog.

28. The method as recited in claim 1, further comprising the step of allowing the one or more providers to send a message request through the networked computer system to the one or more students to schedule the appointment.

29. The method as recited in claim 1, further comprising the step of allowing the one or more students to send a message request through the networked computer system to the one or more providers to post the set of office hour blocks if the set of office hour blocks is not posted.

30. The method as recited in claim 1, further comprising the step of allowing the one or more students to post an endorsement on the networked computer system about the one or more providers after the meeting.

31. The method as recited in claim 30, wherein the endorsement is available to the one or more students and the one or more providers through the networked computer system.

32. The method as recited in claim 30, wherein the endorsement is written by a first student among the one or more students and is provided to a second student among the one or more students through the networked computer system with an appointment reminder for the appointment set by the second student.

33. The method as recited in claim 1, wherein a set of student data input from the one or more computerized academic management systems related to a student among the one or more students is sent through the networked computer system to a provider among the one or more providers with which the appointment was scheduled prior to the meeting.

34. The method as recited in claim 33, wherein the set of student data includes a link to a profile of the student, a profile data taken from the profile of the student, a summary of grades of the student and/or a course rank of the student.

35. The method as recited in claim 33, wherein the set of student data further includes one or more attachments added by the student for the provider to review.

36. The method as recited in claim 1, wherein the set of office hour blocks includes a group session office hour block for which a group of students among the one or more students can schedule the appointment.

37. The method as recited in claim 1, wherein a third flag is raised within the computer system if a student among the one or more students does not attend the meeting.

38. The method as recited in claim 37, wherein an intervention message is sent through the networked computer system to one or more intervention providers in response to the third flag.

39. The method as recited in claim 1, wherein the step of analyzing data includes the step of using a set of conditional statements and/or a statistical analysis.

40. The method as recited in claim 1, wherein the step of analyzing data is repeated on a periodic basis.

41. The method as recited in claim 1, further comprising the step of an administrator of the academic institution editing the first set of at-risk rules and/or the second set of at-risk rules on a periodic basis.

42. The method as recited in claim 1, further comprising the step of allowing a student among the one or more students to raise a self flag within the networked computer system.

43. The method as recited in claim 42, wherein an alert message is sent through the networked computer system to the student in response to the self flag, the alert message including a service catalog.

44. The method as recited in claim 43, wherein the alert message includes a request for the student to schedule the appointment with a referral provider or a referral service from the service catalog.

45. The method as recited in claim 42, wherein a student folder is stored in a memory of the network computer system for each student among the one or more students that includes the first flag, if raised, the second flag, if raised, the self flag, and the meeting, if set, wherein a status change is made to the student folder when a change to the student folder occurs, and wherein one or more student related notes created by one or more providers from the one or more providers are added to the student folder when the one or more student related notes are created.

46. The method as recited in claim 42, further comprising the steps of:

associating within the networked computer system one or more notes that annotate the first flag, the second flag and/or the self flag;

sharing through the networked computer system the one or more notes and the first flag, the second flag and/or the self flag with the one or more providers; and removing the one or more notes and the first flag, the second flag and/or the self flag from the networked computer system in response to a command by the one or more providers.

47. The method as recited in claim 46, wherein the one or more notes have a privacy setting.

48. The method as recited in claim 46, wherein a message is sent through the computer system to the student when the self flag is removed.

49. The method as recited in claim 46, wherein a message is sent through the computer system to the one or more providers when the self flag is removed.

50. The method as recited in claim 1, wherein the one or more computerized academic management systems includes a user interface, further comprising the step of allowing the one or more providers to access the networked computer system through the user interface for the one or more computerized academic management systems.

* * * * *